(12) United States Patent
Suzuki et al.

(10) Patent No.: US 6,433,102 B1
(45) Date of Patent: Aug. 13, 2002

(54) HYDROGENATED POLYMERS, RESIN COMPOSITION, AND PROCESS FOR PRODUCING SUBSTRATE FOR INFORMATION-RECORDING MEDIUM

(75) Inventors: Teruhiko Suzuki; Tsutomu Nagamune; Teiji Kohara; Toshihide Murakami; Haruhiko Takahashi, all of Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/856,156

(22) PCT Filed: Dec. 6, 1999

(86) PCT No.: PCT/JP99/06813

§ 371 (c)(1), (2), (4) Date: Sep. 2, 2001

(87) PCT Pub. No.: WO00/34340

PCT Pub. Date: Jun. 15, 2000

(30) Foreign Application Priority Data

Dec. 4, 1998 (JP) ............................................. 10-346167
Jan. 28, 1999 (JP) ............................................. 11-019963

(51) Int. Cl.[7] .................................................. C08F 8/04
(52) U.S. Cl. .............................. 525/333.3; 575/332.9; 575/338; 575/339
(58) Field of Search .......................... 525/332.9, 333.3, 525/338, 334

(56) References Cited

U.S. PATENT DOCUMENTS 3,780,138 A    12/1973  Hassell et al. .......... 260/880 B
5,043,395 A  *  8/1991  Oshima et al. .......... 525/332.8
5,352,744 A  * 10/1994  Bates et al. .............. 525/332.8
6,350,820 B1 *  2/2002  Hahnfeld et al. ............ 428/1.4

FOREIGN PATENT DOCUMENTS

| EP | 0 186 918 | 10/1985 |
|---|---|---|
| JP | 63-43910 | 2/1988 |
| JP | 63-179953 | 7/1988 |
| JP | 1-168643 | 7/1989 |
| JP | 1-317728 | 12/1989 |
| JP | 1-318015 | 12/1989 |

* cited by examiner

Primary Examiner—Bernard Lipman
(74) Attorney, Agent, or Firm—Armstrong, Westerman & Hattori, LLP

(57) ABSTRACT

A hydrogenated product of an aromatic vinyl polymer, wherein the hydrogenation rate of the aromatic rings thereof is at least 97%, a ratio (Mw/Mn) of the weight average molecular weight (Mw) to the number average molecular weight (Mn) is at most 2.0, the weight average molecular weight (Mw) is 100,000 to 300,000, and the content of a component having a molecular weight (M) of at most 10,000 is at most 2% by weight based on the total weight of the polymer; a hydrogenated product of an aromatic vinyl polymer, wherein the content of foreign matter having a particle diameter of at least 0.5 μm in the hydrogenated polymer is at most $3.0 \times 10^4$ particles/g; and a substrate for information recording media obtained by molding a resin material containing a hydrogenated product of an aromatic vinyl polymer, wherein the hydrogenation rate of the aromatic rings thereof is at least 97%, a :ratio (Mw/Mn) of the weight average molecular weight (Mw) to the number average molecular weight (Mn) is at most 2.0, and the weight average molecular weight (Mw) is 100,000 to 300,000, and production process thereof.

14 Claims, No Drawings

HYDROGENATED POLYMERS, RESIN COMPOSITION, AND PROCESS FOR PRODUCING SUBSTRATE FOR INFORMATION-RECORDING MEDIUM

TECHNICAL FIELD

The present invention relates to a hydrogenated polymer (may also be referred to as "a hydrogenated product of an aromatic vinyl polymer") obtained by hydrogenating an aromatic vinyl polymer, a resin composition comprising the hydrogenated polymer and a production process of a substrate for information recording media, and more particularly to a substrate for information recording media, which is excellent in mechanical strength, a resin composition excellent in moisture resistance and molding and processing ability, and a hydrogenated product of an aromatic vinyl polymer suitable for use in providing such substrate and resin composition. The present invention also relates to a high-quality hydrogenated product of an aromatic vinyl polymer containing little foreign matter.

BACKGROUND ART

Hydrogenated polymers obtained by hydrogenating aromatic rings in aromatic vinyl polymers such as polystyrene have heretofore been known to be molding materials suitable for use in substrates for information recording media, which are small in birefringence. For example, Japanese Patent Application Laid-Open No. 43910/1988 proposes the use of polymers containing at least 30% by weight of a vinylcyclohexane polymer component in its molecular chain for molding materials for optical disk substrates. The publication specifically discloses examples where a hydrogenated product of an aromatic vinyl polymer having a hydrogenation rate of 97% at the aromatic ring portion thereof, a weight average. molecular weight (Mw) of 92,000 and a molecular weight distribution (Mw/Mn) of 1.84, or a hydrogenated product of an aromatic vinyl polymer having a hydrogenation rate of 85% at the aromatic ring portion thereof, a weight average molecular weight (Mw) of 150,000 and a molecular weight distribution (Mw/Mn) of 1.87 was used to mold an optical disk substrate.

However, these optical disk substrates are recognized to be high in light transmittance, small in water absorptivity and relatively small in birefringence, but they have such problems that their mechanical strength is insufficient, the value of birefringence does not reach a sufficiently satisfactory level, and reliability such as long-term heat resistance is insufficient.

Japanese Patent Application Laid-Open No. 318015/1989 proposes optical disk substrates formed of a polyvinylcyclohexane resin having a number average molecular weight (Mn) of at least 50,000 and a softening point of at least 150° C. The publication specifically discloses an example where polyvinylcyclohexane having a hydrogenation rate of 99% at the aromatic ring portion thereof and a weight average molecular weight (Mw) of at least 160,000 was used to mold an optical disk substrate. However, the birefringence of this optical disk was not reduced to a satisfactory level.

For reasons of the above-described facts, there is a strong demand for development of a molding material for providing a substrate which has a sufficiently small birefringence value, is excellent in mechanical strength and is balanced among various properties required of the substrate at a high level.

Further, it has been proven that in the hydrogenated products of the aromatic vinyl polymers, impurities such as finely particulate matter and fibrous matter are mixed in various processes such as their polymerization processes, hydrogenation processes and post-treatment processes, polymerization catalysts and hydrogenation catalysts remain, or gel-like matter is formed, and so they contain an extremely great number of foreign matter when they are minutely inspected. When the hydrogenated products of an aromatic vinyl polymers containing these foreign matter in plenty are molded into moldings such as optical parts such as optical lenses, and substrates for information recording media such as optical disk substrates and magnetic disk substrates, the performance and functions of the resulting moldings are seriously and adversely affected, since these fine foreign matter is not compatible with the hydrogenated products of an aromatic vinyl polymers.

In the case of, for example, an optical lens, a haze value becomes great when the fine foreign matter is contained in plenty, and so the lens tends to become a state that an opaque haze hangs on the surface or in the interior of the lens. When the fine foreign matter is present in plenty in the case of the optical disk, it forms the case of noise and signal error upon reproduction of a signal. A high-capacity optical information recording medium such as DVD (digital video disk) is extremely greater in recording density than the conventional CD (compact disk) and LD (laser disk), and the spot diameter of a laser beam used in recording and reading of information is also extremely small. Accordingly, even the fine foreign matter in the optical disk substrate tends to cause an error, and a bit error rate tends to become great. When the fine foreign matter is present in plenty in the case of a magnetic disk substrate, these foreign matter appears as a great number of projections on the surface of the substrate. A tracking error is easily caused by the surface projections. When a molding formed of a hydrogenated product of an aromatic vinyl polymer containing these foreign matter in plenty is used as a semiconductor related parts such as a carrier (plastic case) of a silicon wafer, the fine foreign matter occurs out of the molding to easily contaminate the silicon wafer.

DISCLOSURE OF THE INVENTION

It is an object of the present invention to provide a molding material capable of providing a substrate for information recording medium having a sufficiently small birefringence value and excellent mechanical strength in combination.

Another object of the present invention is to provide a hydrogenated polymer and a hydrogenated polymer resin composition as molding materials which can provide a substrate having a sufficiently small birefringence value and excellent mechanical strength and moisture resistance, and are also excellent in molding and processing ability, and a substrate for information recording media obtained by molding such a resin material.

A further object of the present invention is to provide a high-quality hydrogenated product of an aromatic vinyl polymer, which is extremely little in the content of fine foreign matter having no compatibility with the polymer.

The present inventors have carried out an extensive investigation with a view toward achieving the above objects. As a result, it has been found that substrates for information recording media molded from a specific hydrogenated polymer having a molecular weight within a specific range and a narrow molecular weight distribution and highly hydrogenated at its aromatic ring portion not only have a sufficiently small birefringence, but also are excellent in mechanical strength. It has further been found that the above-described hydrogenated polymer the content of a component having a molecular weight (M) of at most 10,000 in which is not higher than a certain level, or a resin composition containing the hydrogenated polymer and a specific compounding additive can be molded into moldings excellent in moisture resistance such as anti-whitening property under high-temperature and high-humidity environment and surface smoothness in addition to the above-described properties.

In addition, it has been found that when the content of foreign matter having a particle diameter of at least 0.5 μm contained in a hydrogenated product of an aromatic vinyl polymer is reduced to $3.0 \times 10^4$ particles/g or lower, a molding material suitable for use in optical parts excellent in transparency, heat resistance and low moisture absorption property, small in birefringence and markedly improved in haze value can be provided.

The resin materials containing the hydrogenated product according to the present invention is most suitable for use as a material for optical parts, in particular, a material for substrates for information recording media. The present inventors have been led to completion of the present invention on the basis of these findings.

According to the present invention, there is thus provided a hydrogenated polymer obtained by hydrogenating an aromatic vinyl polymer, wherein the hydrogenated polymer has the following features:
(a) the hydrogenation rate of the aromatic rings thereof is at least 97%;
(b) a ratio (Mw/Mn) of the weight average molecular weight (Mw) to the number average molecular weight (Mn) is at most 2.0;
(c) the weight average molecular weight (Mw) is 100,000 to 300,000; and
(d) the content of a component having a molecular weight (M) of at most 10,000 is at most 2% by weight based on the total weight of the polymer.

According to the present invention, there is also provided a resin composition comprising the hydrogenated polymer described above and an anti-whitening agent.

According to the present invention, there is further provided a process for producing a substrate for information recording media, which comprises molding a resin material containing the hydrogenated polymer described above into the form of a substrate.

According to the present invention, there is still further provided a hydrogenated polymer obtained by hydrogenating an aromatic vinyl polymer, wherein the content of foreign matter having a particle diameter of at least 0.5 μm in the hydrogenated polymer is at most $3.0 \times 10^4$ particles/g.

According to the present invention, there is yet; still further provided a substrate for information recording media, which is obtained by molding a resin material comprising a hydrogenated polymer obtained by hydrogenating an aromatic vinyl polymer and having the following features:
a) the hydrogenation rate of the aromatic rings thereof is at least 97%;
b) a ratio (Mw/Mn) of the weight average molecular weight (Mw) to the number average molecular weight (Mn) is at most 2.0;
c) the weight average molecular weight (Mw) is 100,000 to 300,000; and
d) the content of a component having a molecular weight (M) of at most 10,000 is at most 2% by weight based on the total weight of the polymer.

BEST MODE FOR CARRYING OUT THE INVENTION

<Molding Material for Substrate for Information Recording Medium>

The molding material according to the present invention for a substrate for information media is a resin material composed of any of:
(1) a hydrogenated polymer obtained by hydrogenating an aromatic vinyl polymer, wherein the hydrogenation rate of the aromatic rings thereof is at least 97%, a ratio (Mw/Mn) of the weight average molecular weight (Mw) to the number average molecular weight (Mn) is at most 2.0, and the weight average molecular weight (Mw) is 100,000 to 300,000;
(2) the above-described hydrogenated polymer (1) the content of a component having a molecular weight (M) of at most 10,000 in which is at most 2% by weight based on the total weight of the polymer;
(3) a resin composition comprising the above-described hydrogenated polymer (2) and an anti-whitening agent; and (4) a hydrogenated polymer the content of foreign matter having a particle diameter of at least 0.5 μm in which is at most $3.0 \times 10^4$ particles/g.

<Hydrogenated Polymer>

The hydrogenated polymer according to the present invention is obtained by hydrogenating the aromatic rings in an aromatic vinyl polymer. The hydrogenation rate of the aromatic rings in the hydrogenated polymer according to the present invention is 97% or higher, preferably 98% or higher, more preferably 99% or higher based on the whole aromatic ring in the aromatic vinyl polymer. If the hydrogenation rate of the aromatic rings is extremely low, the birefringence of the resulting hydrogenated polymer becomes great. It is hence not preferable to conduct the hydrogenation at such a low hydrogenation rate. The hydrogenation rate of the aromatic rings can be determined by a $^1$H-NMR measuring method.

The weight average molecular weight (Mw) of the hydrogenated product of the aromatic vinyl polymer is within a range of generally 10,000 to 300,000, preferably 100,000 to 270,000, more preferably 100,000 to 250,000: in terms of polystyrene as measured by gel permeation chromatography (GPC). The molecular weight distribution of the hydrogenated product of the aromatic vinyl polymer is expressed by a ratio (Mw/Mn) of the weight average molecular weight (Mw) to the number average molecular weight (Mn), both, in terms of polystyrene as measured by GPC and is at most 2.0, preferably at most 1.7, more preferably at most 1.3. If the Mw/Mn of the hydrogenated product of the aromatic vinyl polymer is extremely high, the resulting molding material is deteriorated in mechanical strength, and so any satisfactory molding cannot be provided. In addition, such problems that the birefringence becomes great are caused. If the weight average molecular weight (Mw) is extremely low, the mechanical strength of the resulting molding material is deteriorated, and so any satisfactory molding cannot be provided. If the weight average molecular weight (Mw) is extremely high on the other hand, the molding ability of the resulting molding material is deteriorated, and the birefringence thereof becomes great. It is hence not preferable to use any hydrogenated polymer having such a low or high weight average molecular weight.

In a preferred hydrogenated product of an aromatic vinyl polymer in the present invention, the content of a component having a molecular weight (M) of at most 10,000 in the polymer is controlled to at most 2% by weight, preferably at most 1.5% by weight, more preferably at most 1% by weight based on the total weight of the polymer. The content of the component having a molecular weight (M) of at most 10,000 is controlled within the above range, whereby the surface smoothness of a molding obtained by molding such a hydrogenated product of the aromatic vinyl polymer is improved and exhibits excellent performance as an optical part, in particular, a substrate for information recording media.

The aromatic vinyl polymer used as a raw material is a polymer in which a ratio (Mw/Mn) of the weight average molecular weight (Mw) to the number average molecular weight (Mn) is generally at most 2.0, the weight average molecular weight (Mw) is 100,000 to 400,000, preferably 100,000 to 300,000, more preferably 100,000 to 280,000.

If the weight average molecular weight (Mw) of the aromatic vinyl polymer used as a raw material is extremely high, it is difficult to conduct the hydrogenation reaction of the aromatic rings at a high hydrogenation rate, and a molecular chain scissoring reaction, which is a competitive reaction, proceeds if the hydrogenation reaction is allowed to proceed until the hydrogenation rate reaches about 100%, so that the molecular weight distribution of the resulting hydrogenated product becomes wider, and the strength properties and heat resistance thereof are lowered because a low-molecular weight component increases. If the weight average molecular weight (Mw) is extremely low on the other hand, the strength properties of the polymer are deteriorated, and so it is difficult to provide any satisfactory molding. It is hence not preferable to use any aromatic vinyl polymer having such a low or high weight average molecular weight.

No particular limitation is imposed on the production process of the aromatic vinyl polymer used as a raw material. However, the polymer can be obtained by, as a preferred process, for example, (co)polymerizing an aromatic vinyl compound or an aromatic vinyl compound and a monomer copolymerizable therewith in a hydrocarbon solvent.

(1) Aromatic Vinyl Compound:

No particular limitation is imposed on the aromatic vinyl compound so far as it is a compound having an aromatic ring and a polymerizable vinyl group. Typical examples of the aromatic vinyl compound include those represented by the following formula:

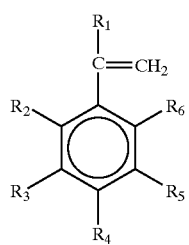

(I)

wherein $R_1$ represents a hydrogen atom or an alkyl group, and $R_2$ to $R_6$ represent, independently of one another, a hydrogen atom, an alkyl group or a halogen atom.

The alkyl group represented by $R_1$ in the formula is preferably a lower alkyl group having 1 to 5 carbon atoms, and specific examples thereof include methyl, ethyl, propyl, isopropyl, butyl, isobutyl, sec-butyl, tert-butyl and amyl groups. $R_2$ to $R_6$ are preferably hydrogen atoms or alkyl groups, more preferably hydrogen atoms or the same lower alkyl groups as in $R_1$. Examples of the halogen atom in $R_2$ to $R_6$ include fluorine, bromine, chlorine and iodine atoms.

As specific examples of the aromatic vinyl compounds, may be mentioned styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butyl-styrene, 5-t-butyl-2-methylstyrene, monochlorostyrene, dichlorostyrene and monofluorostyrene. Among these, styrene and α-methylstyrene are preferred.

These aromatic vinyl compounds may be used either singly or in any combination thereof.

(2) Copolymerizable Monomer:

No particular limitation is imposed on the monomer copolymerizable with the aromatic vinyl compound so far as it is copolymerizable with the aromatic vinyl compound by a polymerization method such as radical polymerization, anionic polymerization or cationic polymerization. As examples thereof, may be mentioned conjugated diene monomers such as 1,3-butadiene, isoprene, 2,3-dimethyl-1,3-butadiene, 1,3-pentadiene and 1,3-cyclohexadiene; nitrile monomers such as acrylonitrile, methacrylonitrile and α-chloroacrylonitrile; (meth)acrylic ester monomers such as methyl methacrylate and methyl acrylate; unsaturated fatty acid monomers such as acrylic acid, methacrylic acid and maleic anhydride; polyolefins such as ethylene and propylene; and phenylmaleimide. These monomers copolymerizable with the aromatic vinyl compound may be used either singly or in any combination thereof.

A proportion of the aromatic vinyl monomer used for obtaining the aromatic vinyl polymer is suitably selected as necessary for the end application intended. However, the proportion is generally at least 50% by weight, preferably at least 70% by weight, more preferably at least 90% by weight, most preferably 100% by weight. The birefringence of the resulting hydrogenated product becomes more sufficiently small as the proportion of the aromatic vinyl monomer in the aromatic vinyl polymer increases.

(3) Initiator:

Examples of an initiator used in the polymerization of the aromatic vinyl polymer include organoalkali metals and combination of an organoalkali metal and a Lewis base. Initiators composed of a combinations of an organoalkali metal and a Lewis base are preferred for the purpose of narrowing the molecular weight distribution of the resulting polymer.

Examples of the organoalkali metals include monoorganolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithio-benzene; sodium naphthalene; and potassium naphthalene. Among these, the organolithium compounds are preferred, with the monoorganolithium compounds being particularly preferred.

These organoalkali metals may be used either singly or in any combination thereof. The amount of the organo-alkali metal used is suitably selected according to the molecular weight required of the polymer formed. It is generally within a range of 0.05 to 100 mmol, preferably 0.10 to 50 mmol, more preferably 0.15 to 20 mmol per 1100 g of the monomer (s).

The Lewis base is useful in obtaining an aromatic vinyl polymer having a narrow molecular weight distribution. No particular limitation is imposed on the Lewis base so far as it is that commonly used in solution polymerization, and examples thereof include ether compounds; tertiary amine compounds such as tetramethylethylenediamine, trimethylamine, triethylamine and pyridine; alkali metal alkoxides such as potassium t-amyloxide and potassium t-butoxide; and phosphine compounds such as triphenylphosphine. Among these, the ether compounds are particularly preferred in that the molecular weight distribution (Mw/Mn) of the resulting aromatic vinyl polymer can be sufficiently narrowed.

No particular limitation is imposed on the ether compounds. However, those having generally 2 to 100 carbon atoms, preferably 4 to 50 carbon atoms, more preferably 4 to 20 carbon atoms are preferably used. Specific examples thereof include aliphatic monoethers such as dimethyl ether, diethyl ether, diisopropyl ether, dibutyl ether, diamyl ether, diisoamyl ether, methyl ethyl ether, methyl propyl ether, methyl isopropyl ether, methyl butyl ether, methyl isoamyl ether, ethyl propyl ether, ethyl isopropyl ether and ethyl butyl ether; aromatic monoethers such as anisole, phenetole, diphenyl ether and dibenzyl ether; cyclic monoethers such as tetrahydrofuran and tetrahydropyran; alkylene glycol dialkyl ethers such as ethylene glycol dimethyl ether, ethylene glycol methyl ethyl ether, ethylene glycol diethyl ether, ethylene glycol dipropyl ether, ethylene glycol dibutyl ether, diethylene glycol diamyl ether, ethylene glycol dioctyl ether, propylene glycol dimethyl ether, propylene glycol diethyl ether, propylene glycol diethyl ether, propylene glycol dibutyl ether, isopropylene glycol dimethyl ether, isopropylene glycol diethyl ether, butylene glycol dimethyl ether, butylene glycol diethyl ether and butylene glycol dibutyl glycol; alkylene glycol alkyl aryl ethers such as ethylene glycol methyl phenyl ether; alkylene glycol diaryl ethers such as ethylene glycol diphenyl ether; and alkylene glycol diaralkyl ethers such as ethylene glycol dibenzyl ether.

These Lewis bases may be suitably used either singly or in any combination thereof. The amount of these Lewis bases used is within a range of 0.001 to 10.0 mmol, preferably 0.01 to 5.0 mmol, more preferably 0.1 to 2.0 mmol per 1 mol of the organoalkali metal used.

(4) Solvent:

No particular limitation is imposed on the hydrocarbon solvent used in the polymerization of the aromatic vinyl polymer so far as it can dissolve a polymer formed and does not deactivate the initiator. Examples thereof include aliphatic hydrocarbons such as n-butane, n-pentane, isopentane, n-hexane, n-heptane and isooctane; alicyclic hydrocarbons such as cyclopentane, cyclohexane, methylcyclopentane, methylcyclohexane and decalin; and, aromatic hydrocarbons such as benzene and toluene.

Among these, the use of an aliphatic hydrocarbon or alicyclic hydrocarbon is preferred because the hydrogenation reaction can be conducted as it is after the polymerization. These hydrocarbon solvents may be used either singly or in any combination thereof in an amount sufficient for the concentration of the monomer to amount to generally 1 to 30% by weight.

(5) Polymerization conditions:

The polymerization reaction of the aromatic vinyl polymer may be either an isothermal reaction or an adiabatic reaction, and is carried out in a polymerization temperature range of generally 0 to 150° C, preferably 20 to 120° C. The polymerization time is within a range of generally 0.01 to 20 hours, preferably 0.1 to 10 hours.

After the polymerization reaction, the polymer can be recovered by the publicly known method such as steam stripping, direct desolvating or alcoholic solidifying. In the present invention, the polymer may be fed to a hydrogenating process as it is without recovering the polymer from a polymer solution when a solvent inert to the hydrogenation reaction is used upon the polymerization.

(6) Hydrogenation:

No particular limitation is imposed on the hydrogenation of the aromatic vinyl polymer so far as the hydrogenation is carried out in accordance with a hydrogenation process, by which the hydrogenation rate of aromatic rings is high, and a polymer chain is scarcely scissored, and as an example thereof, may be mentioned a process conducted by using a hydrogenation catalyst containing at least one metal selected from nickel, cobalt, iron, titanium, rhodium, palladium, platinum, ruthenium and rhenium in an organic solvent. Among these hydrogenation catalysts, a nickel catalyst is preferred because a hydrogenated product having a small Mw/Mn is provided. The hydrogenation catalyst may be either a heterogeneous catalyst or a homogeneous catalyst.

The heterogeneous catalyst may be used in the form of a metal or metal compound as it is, or by supporting it on a proper carrier. Examples of the carrier include active carbon, silica, alumina, calcium carbonate, titania, magnesia, zirconia, diatomaceous earth and silicon carbide. Among these, the use of diatomaceous earth is preferred because the molecular weight distribution of the resulting hydrogenated product can be more narrowed. In this case, the amount of the metal supported on the carrier is within a range of generally 0.01 to 80% by weight, preferably 0.05 to 60% by weight.

As the homogeneous catalyst, there may be used a catalyst obtained by combining nickel, cobalt, titanium or iron compound with a organometallic compound such as an organoaluminum or organolithium compound; or an organometallic complex of rhodium, palladium, platinum, ruthenium, rhenium or the like. Examples of the nickel, cobalt, titanium or iron compound used in the homogeneous catalyst include acetylacetone salts, naphthenates, cyclopentadienyl compounds and cyclopentadienyldichloro compounds of these various metals. Examples of the organoaluminum compound include alkylaluminums such as triethylaluminum and triisobutylaluminum; alkylaluminum halides such as diethylaluminum chloride and ethylalumlnum dichloride; and alkylaluminum hydrides such as diisobutylaluminum hydride. Examples of the organometallic complex include γ-dichloro-π-benzene complexes, dichloro-tris(triphenylphosphine) complexes and hydridochloro-tris(triphenylphosphine) complexes of the respective metals mentioned above.

These hydrogenation catalyst may be used either singly or in any combination thereof. The amount of the hydrogenated catalyst used is within a range of generally 0.03 to 50 parts by weight, preferably 0.16 to 33 parts by weight, more preferably 0.33 to 15 parts by weight per 100 parts by weight of the aromatic vinyl polymer.

Examples of the organic solvent used in the hydrogenation process include the aliphatic hydrocarbons described above; the alicyclic hydrocarbons described above; ethers such as tetrahydrofuran and dioxane; alcohols; and esters. These organic solvents may be used either singly or in any combination thereof. The amount of the organic solvent used is within a range sufficient for the concentration of the aromatic vinyl polymer to amount to generally 1 to 50% by weight, preferably 3 to 40% by weight, more preferably 5 to 30% by weight.

The hydrogenation reaction is performed at a temperature within a range of generally 10 to 250° C., preferably 50 to 200° C., more preferably 80 to 180° C. under a hydrogen pressure within a range of generally 1 to 300 $kg/cm^2$, preferably 10 to 250 $kg/cm^2$, more preferably 20 to 200 $kg/cm^2$.

<Resin Composition>

The resin composition according to the present invention comprises a hydrogenated polymer, wherein the hydrogenation rate of the aromatic rings thereof is at least 97%, a ratio (Mw/Mn) of the weight average molecular weight (Mw) to the number average molecular weight (Mn) is at most 2.0, the weight average molecular weight (Mw) is 100,000 to 300,000, and the content of a component having a molecular weight (M) of at most 10,000 is at most 2% by weight based on the total weight of the polymer, and an anti-whitening agent.

For use application to substrates for information recording media, there may be used a resin composition comprising a hydrogenated product of an aromatic vinyl polymer, wherein the hydrogenation rate of the aromatic rings thereof is at least 97%, a ratio (Mw/Mn) of the weight average molecular weight (Mw) to the number average molecular weight.(Mn) is at most 2.0, and the weight average molecular weight (Mw) is 100,000 to 300,000, and an anti-whitening agent.

This resin composition is used as a molding material, whereby moldings excellent in anti-whitening effect and molding and processing ability can be provided.

The anti-whitening effect means a property that the resulting molding undergoes no whitening under high-temperature and high-humidity environment or in a steam test. The molding and processing ability means a property that a molding little in defects such as irregularities on the surface of the molding, and surface imperfection such as silver streaks and voids, and hence excellent in surface smoothness can be provided.

<Anti-whitening Agent>

The anti-whitening agent used in the present invention is a substance capable of imparting an anti-whitening effect, i.e., a function that whitening of a molding formed of the hydrogenated polymer can be prevented under high-temperature and high-humidity environment or in a steam test when it is incorporated in a certain amount into the hydrogenated product of the aromatic vinyl polymer.

Such an anti-whitening agent includes at least one substance selected from the group consisting of other polymers than the hydrogenated products of the aromatic vinyl polymers, partially etherified compounds of polyhydric alcohols, partially esterified compounds of polyhydric alcohols and finely particulate fillers.

(1) Other Ppolymers than the Hydrogenated Products of the Aromatic Vinyl Polymers:

No particular limitation is imposed on polymers capable of being incorporated into the hydrogenated products of the aromatic vinyl polymers in the present invention so far as they are polymers capable of imparting an anti-whitening effect when they are incorporated into the hydrogenated products of the aromatic vinyl polymers according to the present invention. However, the polymer is preferably such that when the polymer is incorporated into the hydrogenated product of the aromatic vinyl polymer, the form of the polymer before incorporation changes to form, for example, a microdomain state, whereby the polymer can be dispersed in the hydrogenated polymer.

Such polymers include soft polymers such as rubbery polymers and thermoplastic elastomers, and resins.

Specific examples of the resins include polyether or polythioether polymers such as poly(phenylene sulfide) and poly(phenylene ether); polyester polymers such as aromatic polyester, polyarylate, polyethylene terephthalate, polybutylene terephthalate, polycarbonate and poly(ether ketone); linear polyolefin polymers such as polyethylene, polypropylene and poly(4-methylpentene-1); general-purpose transparent resins such as polymethyl methacrylate, copolymers cyclohexyl methacrylate and methyl methacrylate and acrylonitrile-styrene copolymers (AS resins); acrylic resins; MS resins; and liquid crystal plastics.

The soft polymers used in the present invention are polymers having a glass transition temperature of 40° C. or lower and include ordinary rubbery polymers and thermoplastic elastomers. Incidentally, when rubbery polymers obtained by block copolymerization, and the like have at least two glass transition temperatures, they may be used as the soft polymers so far as the lowest glass transition temperature thereof is 40° C. or lower.

Specific examples of the rubbery polymers include isoprene rubber and hydrogenated products thereof; chloroprene rubber and hydrogenated products thereof; saturated polyolefin rubbers such as ethylene propylene copolymers, ethylene-α-olefin copolymers and propylene. α-olefin copolymers; diene copolymers such as ethylene.propylene-.diene terpolymers, α-olefin.diene copolymers, diene copolymers, isobutylene.isoprene copolymers and isobutylene.diene copolymers, halides thereof, and hydrogenated products of the diene copolymers and halides thereof; acrylonitrile.butadiene copolymers and hydrogenated products thereof; fluorine-containing rubbers such as vinylidene fluoride.ethylene trifluoride copolymers, vinylidene fluoride.propylene hexafluoride copolymers, vinylidene fluoride.propylene hexafluoride.ethylene tetrafluoride terpolymers and propylene.ethylene tetrafluoride copolymers; special rubbers such as urethane rubber, silicone rubber, polyether rubber, acrylic rubber, chlorosulfonated polyethylene rubber, epichlorohydrin rubber, propylene oxide rubber and ethylene.acrylic rubber; norbornene rubbery polymers such as copolymers of a norbornene monomer and ethylene or an α-olefin, terpolymers of a norbornene monomer, ethylene and an α-olefin, ring-opening polymers of norbornene monomers and hydrogenated products of ring-opening polymers of norbornene monomers; random copolymers such as styrene.butadiene rubber and high-impact styrene rubber obtained by emulsion polymerization or solution polymerization, and hydrogenated product thereof.

Specific examples of the thermoplastic elastomers include thermoplastic styrene elastomers such as linear or radial block copolymers of an aromatic vinyl monomer and a conjugated diene monomer, such as styrene.butadiene.styrene rubber, styrene.isoprene.styrene rubber and styrene ethylene butadiene styrene rubber, and hydrogenated products thereof; thermoplastic urethane elastomers; thermoplastic polyamide elastomers; thermoplastic 1,2-polybutadiene elastomers; thermoplastic vinyl chloride elastomers; and fluorine-containing thermoplastic elastomers.

Among these, the copolymers of an aromatic vinyl monomer and a conjugated diene monomer, and hydrogenated products thereof are preferred because they are good in dispersibility in the hydrogenated products of the aromatic vinyl polymers. The copolymers of an aromatic vinyl monomer and a conjugated diene monomer may be either black copolymers or random copolymers. The copolymers are more preferably hydrogenated at their unsaturated portions other than the aromatic rings from the viewpoint of weather resistance. Specific examples thereof include styrene-butadiene block copolymers, styrene.butadiene.styrene block copolymers, styrene.isoprene block copolymers, styrene.isoprene.styrene block copolymers and hydrogenated products thereof, and styrene.butadiene random copolymers and hydrogenated products thereof.

When the above-described polymer is added, many dispersed microdomains are formed in the resulting moldings in many cases. The average particle diameter (determined by measuring the length and breadth of each of 100 microdomains selected at random by observation through an electron microscope, calculating a microdomain diameter from the measured value in accordance with the expression [(length+breadth)/2] and taking an average of the calculated values) is generally 0.001 to 0.5 μm, preferably 0.005 to 0.3 μm, particularly preferably 0.01 to 0.2 μm. The formation of such microdomains is preferred because the resulting molding is balanced between transparency and anti-whitening effect under high-temperature and high-humidity environment at a high level.

(2) Partially Etherified Compound and Partially Esterified Compound:

The partially etherified compound used in the present invention is an organic compound having at least one alcoholic hydroxyl group and at least one ether linkage. The partially esterified compound is an organic compound having at least one alcoholic hydroxyl group and at least one ester linkage. The partially etherified compound or partially esterified compound is incorporated into the hydrogenated product of the aromatic vinyl polymer, whereby whitening under high-temperature and; high-humidity environment can be prevented, and high transparency can be retained.

No particular limitation is imposed on the organic compound having at least one alcoholic hydroxyl group and at least one ether linkage so far as it is an organic compound having at least one alcoholic hydroxyl group, not a phenolic hydroxyl group, and at least one ether linkage unit in its molecule. The partially etherified compound is such a compound that at least one of hydroxyl groups in a polyhydric alcohol has been etherified. The polyhydric alcohol has at least 2, preferably at least 3, more preferably 3 to 8 hydroxyl groups.

No particular limitation is imposed on the organic compound having at least one alcoholic hydroxyl group and at least one ester linkage so far as it is an organic compound having at least one alcoholic hydroxyl group, not a phenolic hydroxyl group, and at least one ester linkage unit in its molecule. The partially esterified compound is such a compound that at least one of hydroxyl groups in a polyhydric alcohol has been esterified. The polyhydric alcohol has at least 2, preferably at least 3, more preferably 3 to 8 hydroxyl groups.

Specific examples of the polyhydric alcohol include polyethylene glycol, glycerol, trimethylolpropane, pentaerythritol, diglycerol, triglycerol, dipentaerythritol, 1,6,7-trihydroxy-2,2-di(hydroxy-methyl)-4-oxoheptane, sorbitol, 2-methyl-1,6,7-trihydroxy-2-hydroxymethyl-4-oxoheptane, 1,5,6-trihydroxy-3-oxohexane pentaerythritol and tris(2-hydroxy-ethyl)isocyanulate. Among these, trihydric or still higher polyhydric alcohols, particularly polyhydric alcohol having 3 to 8 hydroxyl groups are preferred. In order to obtain the partially esterified compound, glycerol, diglycerol, triglycerol or the like capable of synthesizing a partially esterified compound containing an α,β-diol is preferred.

Specific examples of such partially etherified compounds and partially esterified compounds include etherified products and esterified products of polyhydric alcohols, such as glycerol monostearate, glycerol monolaurate, glycerol monobehenate, diglycerol monostearate, glycerol distearate, glycerol dilaurate, pentaerythritol monostearate, pentaerythritol monolaurate, pentaerythritol monobehenate, pentaerythritol distearate, pentaerythritol dilaurate, pentaerythritol tristearate and dipentaerythritol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxoheptane, ether compounds obtained by a reaction of a condensate of p-nonylphenyl ether with formaldehyde with glycidol, ether compounds obtained by a reaction of a condensate of p-octylphenyl ether with formaldehyde with glycidol and ether compounds obtained by a reaction of a condensate of p-octylphenyl ether with dicyclopentadiene with glycidol.

These partially etherified compounds and partially esterified compounds of the polyhydric alcohols may be used either singly or in any combination thereof.

No particular limitation is imposed on the molecular weights of these partially etherified compounds and partially esterified compounds of the polyhydric alcohols. However, a compound having a molecular weight of generally 500 to 2,000, preferably 800 to 1,500 is preferred because the transparency of the resulting molding material is scarcely deteriorated.

(3) Finely Particulate Filler:

The finely particulate fillers used in the present invention include organic and inorganic fillers. However, no particular limitation is imposed on the filler so far as it is that commonly used in polymer industries.

These finely particulate fillers are such that when they are incorporated into the hydrogenated product of the aromatic vinyl polymer (hydrogenated polymer), they are dispersed in the hydrogenated polymer in the finely particulate state before incorporation without changing the form thereof. Therefore, even when the composition of a filler is the same as that of the above-described another polymer than the hydrogenated polymers, the filler is said finely particulate filler so far as it can be dispersed in the hydrogenated polymer while retaining the finely particulate form before incorporation.

As the organic filler, may be used general organic polymer particles or crosslinked organic polymer particles. Specific examples thereof include particles or crosslinked particles of polyolefins such as polyethylene, polypropylene, poly (methyl-1-butene), poly(4-methyl-1-pentene) and poly(l-butene); halogen-containing vinyl polymers such as polyvinyl chloride, polyvinylidene chloride, polyvinyl fluoride, polyvinylidene fluoride, polychloroprene and chlorinated rubber; (co)polymers derived from α,β-unsaturated acids or derivatives thereof, such as polyarylate, polymethacrylate, polyacrylamide, polyacrylonitrile, acrylonitrile.butadiene.styrene terpolymers, polyacrylonitrile and acrylonitrile styrene.acrylic ester terpolymers; polymers derived from an unsaturated alcohol and an amine or acyl derivative or acetal thereof, such as polyvinyl alcohol, polyvinyl acetate, polyvinyl stealate, polyvinyl benzoate, polyvinyl maleate, polyvinyl butyral, polyallyl phthalate, polyallylmelamine and ethylene.vinyl acetate copolymers; polymers derived from polyethylene oxides or bisglycidyl ethers; polyphenylene oxide; polycarbonate; polysulfone; polyurethane; urea resins; polyamides such as nylon 6, nylon 66, nylon 11 and nylon 12; polyesters such as polyethylene terephthalate, polybutylene terephthalate and poly(1,4-dimethylol cyclohexane terephthalate); polymers derived from aldehyde and phenol, urea or melamine and having a crosslinked structure, such as phenol.formaldehyde resins, urea.formaldehyde resin and melamine.formaldehyde resins; and natural high-molecular weight compounds, for example, cellulose acetate, cellulose propionate, cellulose ether, etc.

Examples of the inorganic fillers include oxides, hydroxides, sulfides, nitrides, halides, carbonates, sulfates, acetates, phosphates, phosphates, organic carboxylates, silicates, titanates and borates of elements of Groups 1, 2, 4, 6, 7, 8 to 10, 11, 12, 13 and 14, and hydrates or complex compounds thereof; and natural mineral particles. Specific examples thereof include particles of compounds of elements of Group 1, such as lithium fluoride and borax (sodium borate hydrate); compounds of elements of Group 2, such as magnesium carbonate, magnesium phosphate, magnesium oxide, magnesium chloride, magnesium acetate, magnesium fluoride, magnesium titanate, magnesium silicate, magnesium silicate hydrate (talc), calcium carbonate, calcium phosphate, calcium phosphate, calcium sulfate (gypsum), calcium acetate, calcium terephthalate, calcium hydroxide, calcium silicate, calcium fluoride, calcium titanate, strontium titanate, barium carbonate, barium phosphate, barium sulfate and barium phosphite; compounds of elements of Group 4, such as titanium dioxide (titania), titanium monoxide, titanium nitride, zirconium dioxide (zirconia) and zirconium monoxide; compounds of elements of Group 6, such as molybdenum dioxide, molybdenum trioxide and molybdenum sulfide; compounds of elements of Group 7, such as manganese chloride and manganese acetate; compounds of elements of Groups 8 to 10, such as cobalt chloride and cobalt acetate; compounds of elements of Group 11, such as copper(1) iodide; compounds of elements of Group 12, such as zinc oxide and zinc acetate; compounds of elements of Group 13, such as aluminum oxide (alumina), aluminum fluoride and aluminosilicate (alumina silicate, kaolin, kaolinite); compounds of elements of Group 14, such as silicon oxide (silica, silica gel), black lead, carbon, graphite and glass; and natural minerals such as carnallite, kinite, mica (mica, phlogopite) and pyrosmalite.

The average particle diameter of the inorganic filler is within a range of generally 0.05 to 50 $\mu$m, preferably 0.1 to 30 $\mu$m in terms of an average particle diameter determined from diameters of 3,000 to 5,000 particles by observation through an electron microscope. Spherical particles that a ratio (length/breadth) of the length to the breadth is at most 2 are preferred to needle particles. When the size of the filler falls within this range, the transparency can be balanced with the anti-whitening effect under high-temperature and high-humidity environment at a high level.

Among these anti-whitening agents, the soft polymers, partially etherified compounds and partially esterified compounds are preferred because the transparency, heat resistance, and molding and processing ability of the resulting resin composition can be balanced with the anti-whitening effect under high-temperature and high-humidity environment at a high level.

In the present invention, the anti-whitening agent described above is incorporated in a proper amount into the hydrogenated product of the aromatic vinyl polymer. The amount of this agent incorporated is determined according to the combination of the hydrogenated product of the aromatic vinyl polymer and the anti-whitening agent. If the amount incorporated is too great, the glass transition temperature and transparency of the resulting resin composition are greatly deteriorated, and so the resin composition becomes unsuitable for use as an optical material. If the amount incorporated is too small on the other hand, the resulting moldings may undergo whitening in some cases.

The amount of the anti-whitening agent incorporated is generally 0.01 to 10 parts by weight, preferably 0.02 to 5 parts by weight, more preferably 0.05 to 2 parts by weight per 100 parts by weight of the hydrogenated product of the aromatic vinyl polymer. The amount incorporated within the above range is preferred because the heat resistance and transparency of the resulting molding are balanced with the anti-whitening effect under high-temperature and high-humidity environment at a high-level.

When a resin composition, in which the partially etherified compound or partially esterified compound of the polyhydric alcohol among the above-described anti-whitening agents is incorporated, is used to mold a substrate for information recording media, and a recording film layer for information recording is formed on the substrate, besides the anti-whitening effect under high-temperature and high-humidity environment, deterioration of adhesion of the recording film layer under high-temperature and high-humidity environment, partially separating phenomena such as blister, corrosion of the recording film layer, etc. can be prevented. Therefore, such a resin composition is useful.

<Hydrogenated Product of Aromatic Vinyl Polymer Containing Little Foreign Matter>

The high-quality hydrogenated product of the aromatic vinyl polymer containing little foreign matter according to the present invention is a hydrogenated polymer the content of foreign matter having a particle diameter of at least 0.5 $\mu$m in which is at most $3.0 \times 10^4$ particles/g. The term "foreign matter" as used herein means impurities (contaminants), catalyst residue, gelled products, etc. mixed in the form of fine particle, fiber, plate or the like into the hydrogenated polymer without being compatibilized therewith. The content of the foreign matter having a particle diameter of at least 0.5 $\mu$m is a value determined by subjecting an organic solvent solution of the hydrogenated polymer at a concentration of 1.5% by weight to measurement by means of a light scattering type fine particle detector.

The cyclic hydrocarbon polymer according to the present invention contains foreign matter having a particle diameter of at least 0.5 $\mu$m in an amount of at most $3 \times 10^4$ particles/g, preferably at most $2.0 \times 10^4$ particles/g. In use application to optical disk substrates of which particularly high transparency (low haze) and low bit error rate are required, the content of foreign matter having a particle diameter of at least 0.5 $\mu$m can be reduced to preferably at most $1.0 \times 10^4$ particles/g, more preferably at most $7.0 \times 10^3$ particles/g, particularly preferably at most $5.0 \times 10^3$ particles/g. The lower limit of the content of foreign matter having a particle diameter of at least 0.5 $\mu$m is generally about $0.1 \times 10^3$ particles/g, often about $0.5 \times 10^3$ particles/g from the viewpoint of treatment efficiency of foreign matter removal.

The content of foreign matter in the hydrogenated polymer can be determined by means of the light scattering fine particle detector. The form of the foreign matter is generally spherical. However, the form is not limited thereto. The details of the foreign matter include all substances incompatible with cyclic hydrocarbon polymers such as catalyst residues, gelled products and by-products, including impurities mixed in from the outside. Those substances, having a particle diameter of at least 0.5 $\mu$m as measured by means of the light scattering fine particle detector are regarded as foreign matter, and the content thereof is determined.

In the high-quality hydrogenated polymer containing little foreign matter according to the present invention, the weight average molecular weight (Mw) is preferably adjusted within a range of 100,000 to 300,000, more preferably 100,000 to 270,000, particularly preferably 100,000 to 250,000 in terms of polystyrene as measured by GPC in order to balance it among various properties such as strength properties, moldability and birefringence at a high level. In order to improve the mechanical strength and heat resistance in particular at a high level, the molecular weight distribution (Mw/Mn) thereof is preferably at most 2.0, more preferably at most 1.7, particularly preferably at most 1.3. A hydrogenated polymer the content of a component having a molecular weight (M) of at most 10,000 in which is at most 2% by weight based on the total weight of the polymer is further preferred.

The hydrogenated polymer containing little foreign matter according to the present invention contains a volatile component in an amount of generally at most 0.3% by weight, preferably at most 0.1% by weight, more preferably at most 500 ppm. In order to provide a particularly high-quality molding, the content of the volatile component is preferably reduced to at most 500 ppm, more preferably at most 300 ppm, particularly preferably at most 200 ppm. Examples of the volatile component include organic solvents, unreacted monomers or modified products thereof, etc. When a hydrogenated polymer containing the volatile component in a too great amount is molded into a thin molding such as an optical disk substrate by injection molding, the resultant molding tends to cause silver streaks and voids.

<Removal Method of Foreign Matter>

No particular limitation is imposed on the method for removing foreign matter from the hydrogenated product of the aromatic vinyl polymer (hydrogenated polymer). However, as a preferred method for removing the foreign matter, may be mentioned a method comprising filtering a solution containing the hydrogenated polymer through a mechanical filter or a filter having an electrostatically capturing function. After the filtering process, the filtrate is preferably concentrated and dried to remove the volatile component.

(1) Filtration Process:

As examples of the method for filtering the solution containing the hydrogenated polymer, may be mentioned (a) a method comprising filtering the solution at least twice through a mechanical filter having a pore size of at most 0.5 μm, preferably at most 0.3 μm, and (b) a method comprising filtering the solution through a filter having an electrostatically capturing function. Among these methods, the method (b) making use of the filter having the electrostatically capturing function is preferred because it has a high capability of removing ultrafine foreign matter to remove the ultrafine foreign matter which cannot be captured by filtration through the mechanical filter depending on pore openings, and can prevent foreign matte from regenerating by reaggregation after the filtration.

As the solution containing the hydrogenated polymer, the reaction solution after the hydrogenation reaction is used as it is. However, a process for removing the catalyst from the reaction solution may be provided before this filtration process. The concentration of the solution upon the filtration is generally 1 to 40% by weight, preferably 5 to 35% by weight, more preferably 10 to 30% by weight. When a hydrogenated polymer collected as a solid polymer after the hydrogenation process is used, the hydrogenated polymer is dissolved in an organic solvent into a solution.

Various kinds of additives such as an antioxidant, other resin components, etc. may be added to the solution of the hydrogenated polymer before the filtration to dissolve them. These additive components may be added after dissolving them in an organic solvent. For example, when an antioxidant is melt-blended with a cyclic hydrocarbon polymer, it is difficult to sufficiently remove ultrafine foreign matter. However, it is blended in a solution state, and the solution is filtered, whereby the foreign matter can be reduced to a great extent.

The filter having the electrostatically capturing function is a filter having a function that charged foreign matter is electrically captured and removed, and a charged filter medium is generally used. In general, a zeta potential filter ($\zeta$ filter) the zeta potential of which has been controlled is used. As the zeta potential filter, is generally used a filter obtained by applying a positive charge modifier to a filter medium like cellulose fiber/silica/positive charge modifier (polyamine epichlorohydrin resin, aliphatic polyamine or the like) described in Japanese Patent Application Laid-Open (KOHYO) No. 504379/1992 through PCT route, or the like. Examples of other filter media than the above include fiber or membrane filters made of polypropylene, polyethylene, PTFE, etc., fiber filters made of cellulose, glass fiber-made filters, filters made of an inorganic substance such as diatomaceous earth, and metal fiber-made filters. Examples of other positive charge modifiers include melamine-formaldehyde positive ion colloidal and inorganic positive ion colloidal silica. A positive charge modified filter is marketed under the trademark "Zeta Plus" by Cuno Co. The pore size of the filter having the electrostatically capturing function is generally about 0.5 to 1 μm. The filtration through the filter having the electrostatically capturing function is generally carried out in combination with the mechanical filter because its throughput capacity is not necessarily high. No particular limitation is imposed on the order of the respective filters used. The order is optional like, for example, ① the order of mechanical filter/electrostatically capturing filter/mechanical filter, ② the order of mechanical filter/electrostatically capturing filter, ③ the order of electrostatically capturing filter/mechanical filter, and ④ the order of mechanical filter/mechanical filter/electrostatically capturing filter.

No particular limitation is imposed on the mechanical filter so far as it is not adversely affected by any solvent. Examples thereof include fiber or membrane filters made of polypropylene, polyethylene, PTFE, etc., fiber filters made of cellulose, glass fiber-made filters, filters made of an inorganic substance such as diatomaceous earth, and metal fiber-made filters. No particular limitation is imposed on the pore size of the mechanical filter, and it is generally at most 10 μm, preferably at most 5 μm, more preferably at most 1 μm. These mechanical filters may be used either singly or in any combination thereof. However, when no filter having the electrostatically capturing function is used in combination, it is desirable that a filter having a pore size of generally at most 0.5 μm, preferably at most 0.3 μm be used as the mechanical filter, and the filtration process be conducted repeatedly at least twice.

(2) Removal Process of Volatile Component:

It is desirable that the filtrate after the filtration be heated under reduced pressure in, for example, a closed system in such a manner that foreign matter is not mixed in from an external environment, to remove the volatile component, and then cooled under an environment high in air cleanliness class such as in the interior of a clean room, for example, under an environment that the air cleanliness class is strictly controlled to at most class 1,000, preferably at most class 100 to pelletize it. More specifically, in order to remove the solvent after the filtration of the solution, it is preferable to adopt a removal method of the organic solvent, by which no foreign matter is mixed in.

The removal of the organic solvent is conducted by heating the solution of the hydrogenated polymer under reduced pressure (concentrating and drying process). Examples of apparatus for this process include centrifugal, thin film, continuous evaporator type dryers such as Kontro (manufactured by Hitachi Ltd.) and Smith type (manufactured by Shinko-Pfaudler Company, Ltd.); scrape surface exchanger type continuous reactor type dryers such as Votator (manufactured by Chemetron Co.) and Onlator (manufactured by Sakura Seisakusho Co., Ltd.), and high viscosity reactors such as SCR (manufactured by Mitsubishi Heavy Industries, Ltd.). The operation conditions of these apparatus are suitably selected. However, the solution after the filtration is generally heated at a temperature of 220 to 300° C., preferably 240 to 290° C., more preferably 250 to 270° C. under a pressure of at most 25 kPa, preferably at most 15 kPa, more preferably at most 5 kPa to remove the volatile component. The operation time is determined to be time sufficient to remove the volatile component. However, it is generally at least 10 minutes. The operation may be conducted under an atmosphere of an inert gas such as nitrogen or argon.

The hydrogenated polymer tends to reduce their molecular weights by thermal decomposition. In the removal process of the volatile component, it is particularly desirable that the content of the volatile component remaining in the hydrogenated polymer be reduced to about several hundreds ppm or lower. When it is attempted to remove the volatile component to such a degree at once by one-stage concentration and drying, however, the temperature of the hydrogenated polymer or the solution is rapidly lowered by latent heat of evaporation, and so the hydrogenated polymer may be partially stuck to cause clogging or vibration of the apparatus in some cases. Therefore, the removal process of the volatile component is preferably performed by a process of two or more stages. Specifically, there may be mentioned a process in which at least 2 concentrating and drying apparatus are used to continuously remove the volatile component (multi-stage concentrating and drying process). In this case, the same kind of concentrating and drying apparatus may be used in each stage, or different kinds of apparatus may be used in combination. As an example of the combination of different apparatus, may be mentioned a process in which a solution of the hydrogenated polymer is introduced, as a first stage, into a vessel, which can conduct heating, but has no stirrer, at a high temperature under a high pressure to evaporate (flash) the volatile component, and the concentrated polymer solution or molten polymer obtained in the first stage is then introduced, as a second stage, into a concentrating and drying apparatus, which can conduct heating and pressure reduction and is equipped with a stirrer, to remove the remaining volatile component.

Specifically, in the first stage, the volatile component such as a solvent is removed until the concentration of the polymer solution reaches generally 30 to 99.5% by weight, preferably 40 to 98% by weight, more preferably 50 to 95% by weight. If the concentration of the hydrogenated polymer in the first stage is intended to excessively raise, the quantity of heat required for evaporation becomes great, and the load of the apparatus is increased. If the concentration of the hydrogenated polymer in the first stage is too low, latent heat of evaporation becomes great, and the amount of the volatile component recovered is also increased, and so the load of the apparatus in the next process is increased. In any case, the concentration and drying is conducted under the above-described conditions in at least a final stage.

In this process, additives such as antioxidants, light stabilizers and ultraviolet absorbents may be added as needed. More specifically, these additives are uniformly dissolved in the polymer solution before the concentration and drying, and the polymer solution can be then concentrated and dried. The content of the foreign matter is reduced as much as possible, however, it is desirable that these additive be added to the polymer solution before the filtration process. The additives such as the antioxidants are preferably not easily vaporized off under conditions for drying.

<Additives>

Into the hydrogenated products of the aromatic vinyl polymers according to the present invention, may be incorporated additives such as antioxidants, ultraviolet absorbents, light stabilizer, plasticizers, antistatic agents, lubricants, coloring agents (dyes and pigments), near infrared absorbents and fluorescent whitening agents as needed. Amounts of these additives incorporated are suitably selected within limits not impeding the objects of the present invention.

In particular, the antioxidants are preferably contained in the hydrogenated polymers or resin compositions from the viewpoints of preventing deterioration or decomposition of the hydrogenated polymers and the resin composition containing such a hydrogenated polymer by oxidation upon molding, and oxidation of the resulting moldings under service environment.

Examples of the antioxidants include phenolic antioxidants, phosphorus-containing antioxidants an sulfur-containing antioxidants.

As the phenolic antioxidants, the conventionally known antioxidants may be used, and examples thereof include acrylate type phenol compounds described in Japanese Patent Application Laid-Open Nos. 179953/1988 and 168643/1989, such as 2-t-butyl-6-(3-t-butyl-2-hydroxy-5-methylbenzyl)-4-methylphenyl acrylate and 2,4-di-t-amyl-6-[1-(3,5-di-t-amyl-2-hydroxyphenyl)ethyl]phenyl acrylate; alkyl-substituted phenol compounds such as 2,6-di-t-butyl-4-methylphenol, 2,6-di-t-butyl-4-ethylphenol, octadecyl-3-(3,5-di-t-butyl-4-hydroxyphenyl) propionate, 2,2'-methylene-bis(4-methyl-6-t-butylphenol), 4,4'-butylidene-bis(6-t-butyl-m-cresol), 4,4'-thiobis(3-methyl-6-t-butyl-phenol), bis(3-cyclohexyl-2-hydroxy-5-methylphenyl)-methane, 3,9-bis[2-[3-(3-t-butyl-4-hydroxy-5-methyl-phenyl)propionyloxy]- 1,1-dimethylethyl]-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3', 5'-di-t-butyl-4'-hydroxyphenyl)propionate]methane [i.e., pentaerythrimethyl-tetrakis[3-(3,5-di-t-butyl-4-hydroxyphenyl)propionate]], triethylene glycol bis[3-(3-t-butyl-4-hydroxy-5-methylphenyl)propionate] and tocopherol; and triazine group-containing phenolic compounds such as 6-(4-hydroxy-3,5-di-t-butylanilino)-2,4-bisoctylthio-1,3,5-triazine,6-(4-hydroxy-3,5-dimethyl-anilino)-2,4-bisoctylthio-1,3,5-triazine, 6-(4-hydroxy-3-methyl-5-t-butylanilino)-2,4-bisoctylthio-1,3,5-triazine and 2-octylthio-4,6-bis-(3,5-di-t-butyl-4-oxyanilino)-1,3,5-triazine.

No particular limitation is imposed on the phosphorus-containing antioxidant so far as they are commonly used in general resin industries. Examples thereof include monophosphite compounds such as triphenyl phosphite, diphenylisodecyl phosphite, phenyldiisodecyl phosphate, tris(nonylphenyl) phosphite, tris-(dinonylphenyl) phosphite, tris(2,4-di-t-butylphenyl) phosphite, tris(2-t-butyl-4-methylphenyl) phosphite, tris-(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy- 9,10-dihydro-9-oxa-10-phosphaphenanthrene; and diphosphite compounds such as 4,4'-butylidene-bis(3- methyl-6-t-butylphenyl-di-tridecyl phosphate), 4,4'-isopropylidene-bis[phenyl-di-alkyl($C_{12}$–$C_{15}$) phosphate], 4,4'-isopropylidene-bis[diphenylmonoalkyl($C_{12-2}$–$C_{15}$) phosphite], 1,1,3-tris(2-methyl-4-di-tridecyl-phosphite-5-t-butylphenyl)butane, tetrakis(2,4-di-t-butyl-phenyl)-4,4'-biphenylene diphosphite, cyclic neopentane-tetrayl bis(isodecyl phosphite), cyclic neopentanetetrayl bis(nonylphenyl phosphite), cyclic neopentanetetrayl bis(2,4-di-t-butylphenyl phosphite), cyclic neopentanetetrayl bis(2,4-dimethylphenyl phosphate) and cyclic neopentanetetrayl bis(2,6-di-t-butylphenyl phosphate). Among these, the monophosphite compounds are preferred, with tris(nonylphenyl)phosphate, tris(dinonylphenyl) phosphate and tris(2,4-di-t-butylphenyl)phosphate being particularly preferred.

Examples of the sulfur-containing antioxidants include dilauryl 3,3-thiodipropionate, dimyristyl3,3'-thiodipropionate, distearyl 3,3-thiodipropionate, laurylstearyl 3,3-thiodipropionate, pentaerythritol tetrakis(β-lauryl thiopropionate) and 3,9-bis(2-dodecyl-thioethyl)-2,4,8,10-tetraoxaspiro[5,5]undecane.

These antioxidants may be used either singly or in any combination thereof. A proportion of the antioxidant incorporated is within a range of generally from 0.001 to 5 parts by weight, preferably from 0.01 to 1 part by weight per 100 parts by weight of the hydrogenated polymer.

<Substrate for Information Recording media>

The substrate for information recording media according to the present invention can be produced by using a resin material composed of the hydrogenated product of the aromatic vinyl polymer (hydrogenated polymer) or the resin composition comprising the hydrogenated polymer to mold it in the form of a substrate by any of the conventional molding methods.

The molding methods include injection molding (injection compression molding), compression molding, press molding, extrusion and cast molding methods, and the like. However, the use of the injection molding (injection compression molding) method is preferred in order to provide a substrate sufficiently small in birefringence and excellent mechanical strength and surface smoothness.

A specific injection molding method includes a method in which the molding material according to the present invention is heated and melted by means of, for example, a heating cylinder, and the molten molding material is charged into a mold and then cooled. A stamper is installed on the inner surface of the mold used to transfer pits, grooves, etc. The form of the substrate is changed according to the standard of the substrate, and the thickness and diameter thereof is generally 0.05 to 10 mm and 30 mm to 300 mm, respectively.

No particular limitation is imposed on the molding conditions. However, it is preferred that the set cylinder temperature of a molding machine be controlled within a range of 200 to 400° C., preferably 220 to 380° C., most preferably 240 to 360° C., and the mold temperature be controlled to 50 to 180° C. If the temperatures are too low, the transferability of the molding material is lowered, and the birefringence of the resulting molding becomes great in both cases. If the temperatures are too high, in some cases, the molding cycle may be elongated, burr may occur or the decomposition of the resin may be caused. It is also possible to adjust the temperature of a sprue part to a separate temperature, for example, 30 to 100° C.

In order to prevent the oxidation, decomposition and the like of the molding material melted in the cylinder upon the molding, there may be used (A) a method of holding the interiors of the cylinder and mold at a low oxygen concentration state, or (B) a method of removing dissolved oxygen in the molding material before the molding. By using such a method, the surface smoothness and the like of the resulting molding are further enhanced. These molding methods may be applied to not only the hydrogenated products of the aromatic vinyl polymers according to the present invention, but also the conventionally known alicyclic structure-containing polymers such as hydrogenated polystyrene, hydrogenated polyvinylcyclohexene and polyvinylcyclohexane.

(A) Method of Holding the Interiors of the Cylinder and Mold at a Low Oxygen Concentration State:

As specific methods for holding the interiors of the cylinder and mold at a low oxygen concentration state upon the molding, may be mentioned (1) a method in which the feed of a molten resin to a molding machine is conducted in an atmosphere of a gas containing oxygen only at a low concentration, and (2) a method in which the interior of an injection unit is held at a state of reduced pressure when a molten resin is fed to the injection unit to conduct injection molding, and the molten resin is injected into a mold to produce a molding.

(1) Method of Conducting the Feed to the Molding Machine in the Atmosphere of the Gas Containing Oxygen Only at a Low Concentration:

The method of conducting the feed to the molding machine in the gas atmosphere containing oxygen only at a low concentration is a method in which the feed of a resin material comprising the hydrogenated product of the aromatic vinyl polymer to the molding machine upon production of a molding by means of a heat melting type molding machine is conducted in an atmosphere of a gas containing oxygen only at a low concentration. As a result, lowering of molecular weight by oxidation, decomposition or the like, coloring of moldings, occurrence of silver streaks, and defective phenomena such as separation on the surfaces of moldings by adhesion of the hydrogenated product of the aromatic vinyl polymer to the mold are markedly improved.

The gas containing oxygen only at a low concentration is a gas inert to the hydrogenated product of the aromatic vinyl polymer and containing oxygen in;an amount of generally at most 2% by volume, preferably at most 1% by volume, more preferably at most 0.1% by volume, particularly preferably at most 0.05% by volume. Examples thereof include helium, neon, nitrogen, argon, xenon, crypton and carbon dioxide.

The inert gas used in the present invention desirably has a boiling point of −100° C. of lower. When an inert gas having a boiling point exceeding −100° C. is used, the inert gas is dissolved in the hydrogenated product of the aromatic vinyl polymer, and the dissolved gas vaporizes upon production of moldings, whereby the hydrogenated product of the aromatic vinyl polymer may foam in some cases, resulting in a molding having silver streaks or bubbles. Therefore, helium, neon, nitrogen, argon and xenon are particularly preferred.

The amount of the gas containing oxygen only at a low concentration used is preferably at least 30 liters, more preferably at least 60 liters, particularly preferably at least 120 liters per kilogram of the resin material fed to the molding machine, and the gas containing oxygen only at a low concentration is fed at this flow rate to create the gas atmosphere containing oxygen only at a low concentration.

In the present invention, the fact that the feed of the resin material is conducted in the gas atmosphere containing oxygen only at a low concentration means that air is replaced by the gas containing oxygen only at a low concentration for the purpose of preventing the hydrogenated polymer fed to the heating cylinder of the molding machine from melting under heat accompanied by air, thereby lessening the amount of air as much as possible or doing away with air. Namely, the feed of the resin material to the molding machine in the present invention is referred to the feed of the resin material to the heating cylinder of the heat melting type molding machine.

Examples of a method for creating the gas atmosphere containing oxygen only at a low concentration in order to replace the air accompanying the resin material by the gas containing oxygen only at a low concentration include a method in which a gas containing oxygen only at a low concentration is sent into a feed hopper for the resin material attached to a molding machine to make the interior of a cylinder a gas atmosphere containing oxygen only at a low concentration, a method in which a gas containing oxygen only at a low concentration is introduced into a heating cylinder of a molding machine at an optional position of the cylinder before a resin material is melted under heat to make the interior of the cylinder or the interiors of the cylinder and the above-described hopper a gas atmosphere containing oxygen only at a low concentration, and a method in which a resin material the air in which has been separately replaced by a gas containing oxygen only at a low concentration is fed to a cylinder.

No particular limitation is imposed on the heat melting type molding machine used in the methods for conducting molding at the low oxygen state, and examples thereof include injection molding machines and extruders.

(2) Method in Which the Interior of an Injection Unit is Held at a State of Reduced Pressure when a Molten Resin is Fed to the Injection Unit to Conduct Injection Molding, and the Molten Resin is Injected into a Mold to Produce a Molding:

The details of the method in which the interior of an injection unit is held at a state of reduced pressure when the resin material comprising the hydrogenated product of the aromatic vinyl polymer is fed to the injection unit to injection-mold it, and the molten resin is injected into a mold to produce a molding will hereinafter be described.

In the case of this method, gas is first discharged through a vent hole provided in a rear part of a cylinder of the injection unit, a feed hopper part for the resin material, or the like, thereby holding the interior of the injection molding machine (cylinder) at a state of reduced pressure.

The pressure within the cylinder is reduced to generally 15 Torr or lower, preferably 8 Torr or lower, more preferably 1 Torr or lower, particularly preferably 0.5 Torr or lower. The resin material is melted and injected under such reduced pressure, whereby for example, generation of a gas component from resin pellets, lowering of molecular weight by decomposition due to insufficient drying of the pellets, and occurrence of defective appearance of moldings, such as coloring of the moldings, occurrence of silver streaks, and separation on the surfaces of the moldings by adhesion of the resin material to the mold can be prevented. Further, it is preferable that air within the injection unit be discharged to purge the interiors of the hopper and cylinder with the gas containing oxygen only at a low concentration, and the injection unit be then vacuumed.

By the purging with the gas containing oxygen only at a low concentration as described above, the optical properties of the resulting molding, such as transparency, are more improved. The conditions for the injection molding conducted in the state of reduced pressure as described above may also be applied to the molding of, other polymers than the hydrogenated polymers according to the present invention.

(B) Method of Removing Dissolved Oxygen in the Molding Material Before the Molding:

Oxidation, decomposition and the like of a molten resin material can also be prevented by lowering the concentration of dissolved oxygen in a molding material (resin material) using, as a pretreatment in the above-described molding, a method of subjecting the resin material to a heat treatment, a treatment under reduced pressure, a replacing treatment under an inert gas atmosphere, or a combination of these treatments, and the same effect as the treatment upon the molding can be achieved.

An example of the method for lowering the concentration of dissolved oxygen in the resin material include a method in which the resin material is subjected to a heat treatment for 0.1 to 100 hours in a temperature range not lower than $(Tg-60)°$ C., but not higher than $(Tg-5)°$ C., wherein Tg is a glass transition temperature of the hydrogenated product of the aromatic vinyl polymer, and then melt-molded. The heat treatment means that the resin is placed under an atmosphere within the above-described temperature range, and is not necessarily aimed at removal of water in the resin material.

The amount of dissolved oxygen is reduced by holding the resin material within the above temperature range. However, it is preferable that the resin material be treated under an atmosphere of low oxygen concentration at the same time. The atmosphere of low oxygen concentration means a gas atmosphere of an oxygen concentration as :low as generally at most 5% by volume, preferably at most 3% by volume, more preferably at most 1% by volume, or a state of reduced pressure of generally 15 Torr or lower, preferably 8 Torr or lower, more preferably 1 Torr or lower. Either method may be used.

Examples of the gas containing oxygen only at a low concentration include helium, neon, nitrogen, argon, xenon, crypton and carbon dioxide. An atmosphere of air diluted with any of the above-described inert gases in such a manner that the oxygen concentration is within the above range may be additionally exemplified.

No particular limitation is imposed on a dryer used in the heat treatment, and an ordinary hot-air circulating tray type dryer, hopper dryer, tray type vacuum dryer or agitated vacuum dryer used in drying of resin pellets may be used.

The resin pellets after the heat treatment are desirably used immediately in melt molding without passing away time. The time from the drying under heat to the molding is generally within 12 hours, preferably within 6 hours, more preferably within 3 hours, particularly preferably within 1 hour. In addition, the resin pellets are desirably held under an atmosphere of low oxygen concentration all the while.

In addition to the heat treatment, it is effective to adopt a method of keeping the resin pellets under an atmosphere of low oxygen concentration before the heat treatment is conducted. More specifically, the resin pellets are kept under a gas atmosphere of an oxygen concentration as low as generally at most 5% by volume, preferably at most 3% by volume, more preferably at most 1% by volume, in a state of reduced pressure of generally 15 Torr or lower, preferably 8 Torr or lower, more preferably 1 Torr or lower, or in a combined state thereof, for example, under an atmosphere of air diluted with the gas containing oxygen only at a low concentration and reduced pressure. The keeping time under such an atmosphere of low oxygen concentration is at least 1 hour, preferably at least 2 hours. Incidentally, the time required to create the atmosphere of low oxygen concentration may be a long time without any problem. For example, a bag or container little in oxygen transmission rate is used as a package upon packaging pellets after production of the pellets, the pellets are charged into the package under an atmosphere of low oxygen concentration, stored for a long period of time while keeping the interior of the package under the atmosphere of low oxygen concentration and then dried as they are. This process is also embraced in the present invention.

The above-described methods (A) and (B) may be effectively used in molding of the conventionally known hydrogenated products of aromatic vinyl polymers, and alicyclic structure-containing polymers, to say nothing of the molding of the specific hydrogenated products of aromatic vinyl polymers in the present invention because lowering of molecular weight by oxidation, decomposition or the like of the molding material, coloring of moldings, occurrence of silver streaks, and defective phenomena such as separation on the surfaces of moldings by adhesion of the hydrogenated product of the aromatic vinyl polymer to the mold can be prevented. The effects are marked upon the molding of substrates for information recording media in particular.

More specifically, (A) the molding method in which molding is conducted under the atmosphere of low oxygen concentration, or (B) the molding method in which the resin material is subjected to the heat treatment and/or the treatment under reduced pressure and then molded is used upon the molding of the resin material, whereby moldings small in birefringence, high in transmittance and little in surface defects by observation through an AFM, preferably substrates for information recording media are provided.

<Recording Film Layer>

In the present invention, a recording film layer is provided on the substrate for information recording media, whereby the substrate can be used as an information recording medium. The recording film layer is an reflective aluminum film layer provided on the surface of the substrate or a layer provided in such a manner that the light reflectance may be irreversibly or reversibly and locally changed. The thickness thereof is several hundreds to several thousand angstroms, or at most 10,000 angstroms at the thickest.

In music CD, CD-ROM and the like, information itself is carved in a stamper part of a mold upon the injection molding, and minute grooves corresponding thereto are formed in the substrate. Therefore, a reflective film layer such as aluminum or gold is formed on a surface including the grooves by sputtering or the like, whereby the recording film layer is formed by the grooves and the reflective film layer.

In writ once CD-R, rewritable magneto-optical disk (MO) and the like, a recording film layer, which changes light reflectance or transmittance irreversibly or reversibly, a reflective film layer, which reflects light, and a thin, inorganic or organic protective film layer, which protects these layers and corrects optical strain, are formed. These layers are formed either singly or as a multi-layer structure in combination by a sputtering method, vapor phase growth method, chemical coating method and/or the like, thereby forming an information recording layer. In the use application to, for example, a magneto-optical disk, an information recording layer obtained by laminating a reflective layer composed of aluminum, gold or an alloy thereof; and a thin protective film layer composed of SiN, SiC or the like on a magneto-optical recording medium (for example, a recording medium of Tb—Fe—Co—, Pt—Tb—Fe—Co or the like) is used. In the case of a phase change type disk, an information recording layer obtained by laminating the same reflective film layer and thin protective film layer as described above on Te—Ge—Sb, In—Sb—Te, Te—Ge—Cr, Te—Ge—Zn or an alloy thereof is used.

The thickness and forming process of these information recording layers vary according to the kinds of substrates for the respective information recording media, and the recording layers are formed according to the standard by a publicly known method.

<Coating Layer>

When an information recording medium such as an, optical disk, making use of the substrate for information recording media according to the present invention, is used, a coating layer for protecting the above-described information recording layer from water and the like is generally formed before use.

(1) Coating Material:

A coating material used in forming the coating layer may be either a silicone coating material or an organic coating material. The silicone coating material is a partially hydrogenated product of a silane compound. Examples of the organic coating material include heat-curing coating materials such as melamine, alkyd, urethane and acrylic paints, and ultraviolet-curing coating materials composed mainly of a polyfunctional acrylic monomer or the like ultraviolet-cured. The ultraviolet-curing coating materials are preferred in that they can be cured under conditions that the hydrogenated products of the aromatic vinyl polymers are hard to be heat-deformed, and a coating layer having sufficient hardness and weather resistance can be provided.

① Ultraviolet-curing Coating material:

The ultraviolet-curing coating materials of the present invention comprises a reactive monomer and/or a reactive oligomer, a photopolymerization initiator and other additives and is diluted with no or an solvent.

In the present invention, those having acrylate group(s) among photopolymerizable monomers are referred to as monofunctional monomers, bifunctional monomers, trifunctional monomers or the like according to the number of acrylate groups. In the present invention, the acrylate group also includes a methacrylate group, an ethacrylate group and the like in addition of the acrylate group in a narrow sense.

Examples of the monofunctional acrylate monomers include n-butyl acrylate, isoamyl acrylate, 2-hydroxy-ethyl methacrylate, 2-hydroxypropyl methacrylate, 2-ethyl-hexyl methacrylate, phenoxyethyl acrylate and phenoxy-propyl acrylate. Among these, those having only the acrylate group in a narrow sense without having a methacrylate group or the like are preferred so as not to inhibit a curing reaction with radical oxygen. Further, those having a side chain having about 4 to 6 carbon atoms are preferred in order to reduce cure shrinkage of a coating film to be formed.

It is also preferred that a long-chain aliphatic monofunctional acrylate monomer or alicyclic monofunctional acrylate monomer be used in order to improve the adhesion of the resulting coating material to hydrogenated product resins of aromatic vinyl polymers. As long-chain aliphatic monofunctional acrylate monomers, are preferred those having an aliphatic moiety having 5 to 18 carbon atoms, preferably. 8 to 16 carbon atoms. If the number of carbon atoms is too small, the adhesion of the resulting coating material becomes poor. If the number of carbon atoms is too great on the other hand, crosslinking is hard to occur, and the strength of the resulting coating layer is deteriorated. Specific examples of the long-chain aliphatic monofunctional acrylate monomers include lauryl acrylate, stearyl acrylate, octyl acrylate, isooctyl acrylate, decyl acrylate and isodecyl acrylate. Specific examples of the alicyclic monofunctional acrylate monomers include tricyclo[$5.2.1.0^{2,6}$]decanyl acrylate, a hydrogenated product thereof, isobornyl acrylate and cyclohexyl acrylate.

Examples of the bi- or trifunctional acrylate monomers include esterified products of polyols such as ethylene glycol, diethylene glycol, tripropylene glycol, butylene glycol, neopentyl glycol, hexanediol, trimethylolpropane, tetramethylolpropane, pentaerythritol and dipentaerythritol with 2 or 3 acrylic acids, and bisphenol F type epoxyacrylates. It is preferred that alicyclic bifunctional acrylates such as those described below monomer be used in order to improve the adhesion of the resulting coating material to hydrogenated product resins of aromatic vinyl polymers. Specific examples of the alicyclic bifunctional acrylate monomers include tricyclo[$5.2.1.0^{2,6}$]decanyl diacrylate, a hydrogenated product thereof, isobornyl diacrylate and cyclohexyl diacrylate.

Examples of tetrafunctional or still higher polyfunctional acrylate monomers include esterified products of polyols such as tetramethylolpropane, pentaerythritol and dipentaerythritol with a 4 or more, preferably 4 to 8 acrylic acids. Generally available tetra to hexafunctional acrylate monomers are particularly preferred.

As the reactive oligomers, may be mentioned polyester acrylates having an acryloyl group at their terminals, epoxyacrylates or polyurethane acrylates having an epoxy group in their molecular chains, and an acryloyl group at their terminals, unsaturated polyesters having a double bond in their molecular chains, an other oligomers having an epoxy group or vinyl ether group.

As examples of the photopolymerization initiator, may be mentioned acetophenones such as 2,2-dimethoxy-2-phenylacetophenone, 2,2-diethoxyacetophenone and chlorinated acetophenone; benzophenones; benzoins such as benzyl, methyl o-benzoylbenzoate and benzoin alkyl ethers; azo compounds such as α,α'-azobisisobutyronitrile, 2,2'-azobispropane and hydrazone; organic peroxides such as benzoyl peroxide and di-tert-butyl peroxide; diphenyl disulfides such as diphenyl disulfide, dibenzyl disulfide and dibenzoyl disulfides.

With respect to mixing proportions of these components, the proportion of the monofunctional acrylate monomer is 15 to 65% by weight, preferably 25 to 60% by weight, more preferably 30 to 55% by weight based on the total weight of the acrylate monomer(s) and the photopolymerization initiator, the proportion of the bi-or trifunctional acrylate monomer is 5 to 50% by weight, preferably 6 to 40% by weight, more preferably 8 to 30% by weight, the proportion of the tetrafunctional or still higher polyfunctional acrylate monomer is 10 to 60% by weight, preferably 12 to 50% by weight, more preferably 15 to 45% by weight, and the proportion of the reactive oligomer is 0 to 60% by weight, preferably 10 to 50% by weight, more preferably 20 to 40% by weight. If the amount of the reactive oligomer is too great, cure shrinkage of a coating film to be formed becomes great, and the adhesion thereof is deteriorated. If the amount is too small, the viscosity of the resulting coating material, and so in some cases, an uniform film may be hard to be formed, or it may take a long time to cure the coating film.

The proportion of the photopolymerization initiator is 1 to 10% by weight, preferably 2 to 6% by weight. If the amount of the tetrafunctional or still higher polyfunctional acrylate monomer is too great, cure shrinkage of a coating film to be formed increases. If the amount is too small, the hardness of the coating film cured is lowered, and curing speed is slowed. If the amount of the monofunctional acrylate monomer is too small, the viscosity of the resulting coating material becomes high, and workability thereof is deteriorated. If the amount of the monofunctional acrylate monomer is too great, cure shrinkage of a coating film to be formed is reduced, and moreover the amount of the bi- or trifunctional acrylate monomer is lessened to deteriorate the flexibility of the cured layer, which forms the cause of occurrence of cracks. The amount of the bi- or trifunctional acrylate monomer is preferably greater in order to improve the adhesion of the resulting coating material.

The ultraviolet-curing coating material according to the present invention preferably comprises at least one monomer selected from the long-chain aliphatic monofunctional acrylate monomer, alicyclic monofunctional acrylate monomer and alicyclic bifunctional acrylate monomer in an amount of at least 40% by weight, more preferably at least 45% by weight, particularly preferably at least 50% by weight. The adhesion of the resulting ultraviolet-curing coating material to hydrogenated product resins of aromatic vinyl polymers is improved as the content of said at least one monomer selected from the long-chain aliphatic monofunctional acrylate monomer, alicyclic monofunctional acrylate monomer and alicyclic bifunctional acrylate monomer increases.

Proper additives may be added to the ultraviolet-curing coating material within limits not impeding the adhesion and hardness of the resulting cured layer. For example, a fluorine-containing nonionic surfactant is added, whereby the wetting of the substrate, and surface smoothness of the substrate after curing the coating layer can be improved. Besides, a proper thermoplastic resin is added, whereby the viscosity of the resulting coating material can be adjusted, and the adhesion thereof can also be improved. Examples of the thermoplastic resin capable of improving the adhesion include hydrogenated products of aromatic vinyl polymers, and resins similar in structure thereto, for example, ring-opening polymers of norbornene monomers, and petroleum resins such as dicyclopentadiene-based, diene-based, aliphatic and water-white resins or hydrogenated products thereof. ② Antistatic Agent:

When the ultraviolet-curing coating material is used as a protective coating material in particular, an antistatic agent is preferably added in order to prevent the electrostatic charge of the resulting cured layer. No particular limitation is imposed on the antistatic agent, and any commonly used antistatic agent may be used. However, a nonionic antistatic agent is preferred for the acrylate monomers. The nonionic antistatic agent is excellent in compatibility with the acrylate monomers, and a uniform ultraviolet-curing composition can be provided. Therefore, the resulting composition is uniform in adhesion and antistatic effect.

When the prevention of electrostatic charge is required of the cured layer (coating layer), the surface electric resistance of the cured layer is controlled to at most $5 \times 10^{13}$ Ω, preferably at most $2 \times 10^{13}$ Ω, more preferably at most $10^{13}$ Ω. In order to do so, it is only necessary to add the antistatic agent in an amount of 1 to 7% by weight, preferably 1.5 to 5% by weight. Even when the antistatic agent is added to and used for the ultraviolet-curing coating material in an amount necessary to sufficiently lower the surface electric resistance, a cured layer having adhesion not interfering with moldings formed of the hydrogenated product of the aromatic vinyl polymer from the viewpoint of practical use can be formed. If the adhesion becomes insufficient, it is preferable that a primer composition be used to form a primer layer as described below.

The above-described coating material may be used as it is. However, it may also be provided as an ultraviolet-curing coating material by dissolving the coating material in a solvent led by an aromatic hydrocarbon solvent such as toluene, xylene or chlorobenzene; an alicyclic hydrocarbon solvent such as cyclohexane or methylcyclohexane; a ketone solvent such as methyl isobutyl ketone, methyl ethyl ketone or acetone; or an ether solvent such as n-butyl ether or diethyl ether; or an ester solvent, cellosolve solvent, chlorine-containing solvent or the like at a concentration at least 80% by weight according to necessity of operability, and the like.

(2) Primer and Formation of Primer Layer:

In the present invention, the surface of a molding such as an optical disk is coated with the specific ultraviolet-curing coating material, which is then irradiated with ultraviolet rays to be cured, thereby forming a protective coating layer. In order to make adhesion between the resin material comprising the hydrogenated product of the aromatic vinyl polymer and the protective coating layer more firm, a primer may be applied prior to the coating of the ultraviolet-curing coating material. As the primer, is preferred a halogenated hydrocarbon polymer. Examples of such a halogenated hydrocarbon polymer include those obtained by halogenating a hydrocarbon polymer obtained by polymerizing or copolymerizing a hydrocarbon monomer such as ethylene, propylene, butadiene, isoprene or styrene, and those obtained by polymerizing or copolymerizing a halogen-containing monomer such as vinyl chloride, vinylidene chloride or chloroprene. Among these, those obtained by chlorinating the hydrocarbon polymers are preferred, with chlorinated polypropylene being particularly preferred.

The molecular weight of the halogenated hydrocarbon polymer is generally 5,000 to 200,000, preferably 10,600 to 150,000, more preferably 20,000 to 100,000. If the molecular weight is too low, the strength of the resulting primer layer is lowered. If the molecular weight is too high, the viscosity of the primer becomes too high, and so workability of the coating is deteriorated. The halogen content in the halogenated hydrocarbon polymer is generally 15 to 55% by weight, preferably 20 to 45% by weight, more preferably 25 to 35% by weight. When the halogen content is too low, adhesion between the protective coating layer and the surface of the molding is also deteriorated.

A photopolymerizable monomer, photopolymerizable oligomer or the like, which will be described subsequently, may be added as a reactive diluent to the primer. In particular, when a monofunctional acrylate monomer is added in a proportion of 2 to 20% by weight, adhesion between the protective coating layer and the primer layer and between the primer layer and the surface of the resin molding is improved, and so the protective coating layer is hard to be separated from the molding. It is hence preferable to add such a reactive diluent. The primer is preferably dissolved in a solvent to use it as a primer solution. No particular limitation is imposed on the solvent so far as it is a poor solvent for the hydrogenated product of the aromatic vinyl polymer. For example, toluene is a good solvent for the hydrogenated product of the aromatic vinyl polymer. However, when toluene is diluted to at most 70% by weight with methyl isobutyl ketone, corrosion of the molding formed of the hydrogenated product of the aromatic vinyl polymer by such a solvent is prevented to a small extent even when the solvent is applied to the molding. Therefore, such a diluted solvent may be used as a solvent for the primer.

A monofunctional acrylate such as n-butyl methacrylate or isoamyl methacrylate is also a poor solvent for the hydrogenated product of the aromatic vinyl polymer and a reactive diluent having an effect as a photopolymerizable monomer added to the primer as described above. Therefore, such a monofunctional acrylate is also preferred. The solid concentration of the primer solution is generally 1 to 30% by weight, preferably 1.5 to 20% by weight, more preferably 2 to 10% by weight. The primer layer is formed by applying the primer solution to the surface of a molding formed of the hydrogenated product of the aromatic vinyl polymer and fully removing a volatile component in the primer solution. However, when only such a reactive diluent as described above is used as a solvent for the primer, the removal process of the volatile component is unnecessary.

No particular limitation is imposed on a coating method of the primer solution on a coating surface. For example, spraying, dipping, spin coating, roll coating or the like may be adopted. No particular limitation is also imposed on the removal method of the volatile component in the primer solution. The volatilizing temperature and time required to substantially remove the solvent in the primer solution vary according to the kind of the solvent used, the coating weight of the primer solution and the shape of a coating surface of the molding. However, it is only necessary to determine the conditions thereof in such a manner that the temperature is at most about 100° C. so as not to cause heat deformation of the molding formed of the hydrogenated product of the aromatic vinyl polymer, and the solvent can be fully removed. Specifically, it is proper that the coated molding is left to stand at about 60 to 100° C. for about 3 to 60 minutes. It is preferable that the coated molding be cooled at room temperature for about 10 seconds to 10 minutes after the removal of the volatile component at a high temperature to cool it to a temperature almost near to room temperature.

No particular limitation is imposed on the coating weight of the primer solution. However, it is preferably such that the thickness of the coating film is about 1 to 10 $\mu$m, particularly about 2 to 5 $\mu$m. When the removal of the volatile component is necessary after the application of the primer solution, the coating weight is preferably controlled to give the above-described coating thickness after fully removing the volatile component. If the coating weight of the primer solution is too little, the effect of the primer solution is lowered. If the coating weight is too great, it is difficult to remove the volatile component, or a hard coating layer is easy to separate from the molding.

(3) Formation of Coating Layer:

In the present invention, the primer layer is formed on the surface of the molding formed of the hydrogenated product of the aromatic vinyl polymer as needed, and the ultraviolet-curing coating material is coated thereon, and then irradiated with ultraviolet rays to cure it, thereby forming a coating layer. The molding formed of the hydrogenated product of the aromatic vinyl polymer may be either a molding formed of a resin material itself comprising the hydrogenated product of the aromatic vinyl polymer or a combined product thereof with another material or molding. The coating layer is formed on the surface of the resin substrate and the recording film layer, or the whole surface thereof or, in particular, a portion of the surface, of which wear resistance and resistance to marring are required.

No particular limitation is imposed on a coating method of the coating material. For example, spraying, dipping, spin coating, roll coating or the like may be used. When the solvent is used, the coated substrate is fully dried after the coating, so as not to substantially contain the solvent. No particular limitation is imposed on the drying method.

The thickness of the ultraviolet-curing coating material is preferably about 2 to 300 $\mu$m in coating, and about 10 to 400 $\mu$m in adhesion. When the solvent is used, the coating layer is controlled so as to give this thickness after drying. If the thickness is too thin, any cured layer having high strength cannot be provided, and so a sufficient effect for improving surface hardness and sufficient adhesion cannot be achieved. If the thickness is too thick, it takes a long time to drying the coating layer and conduct a curing reaction, and so productivity is deteriorated. In addition, when the hardness is low due to insufficient curing, the cured layer is lacking in flexibility and may be cracked in some cases.

A coated surface is required to be sufficiently dried as needed. When the coating material is cured as it contains the solvent in plenty, the coating layer tends to crack, and the cause that a high-hardness coating film cannot be provided is formed. The drying temperature and time required to substantially remove the solvent vary according to the kind of the solvent used, the coating weight of the coating material and the shape of a coating surface of the molding. However, it is only necessary to determine the conditions thereof in such a manner that the temperature is generally at most about 120° C. so as not to cause heat deformation of the base material, and sufficient drying can be conducted. Specifically, it is proper that the coating film is dried at about 60 to 120° C. for about 3 to 60 minutes. It is preferable that the coating film be cooled at room temperature for about 10 seconds to 10 minutes after the drying at a high temperature to cool it to a temperature almost near to room temperature. Incidentally, when no solvent is used, the drying is unnecessary.

Thereafter, the coating film is irradiated with ultraviolet rays from a light source that effectively emits ultraviolet rays, such as a high pressure mercury lamp, whereby curing occurs in a short period of time to form a cured layer having a high hardness. The irradiation dose of the ultraviolet rays varies according to the reactivity of the photopolymerizable monomer(s) and photopolymerization initiator. However, the coating film can be generally cured in a period of time as short as about 5 to 10 seconds in the case of a high pressure mercury lamp of 80 W/cm.

These coating layers may also be not only used for the substrates for information recording media, which are formed of the specific hydrogenated product of the aromatic vinyl polymer according to the present invention, but also provided on substrates for information recording media obtained by molding the conventionally known hydrogenated product of aromatic vinyl polymers, thereby still more improving the reliability of the resulting information recording media.

Further, the above-described coating materials are excellent in such effects that surface slip is good when they are applied to moldings, the antistatic effect is excellent, and printing can be conducted thereon. Therefore, they are useful as protective coating materials, hard coating materials and the like for general moldings such as other optical parts making use of the conventionally known hydrogenated products of aromatic vinyl polymers, or other vinyl cyclic hydrocarbon resins.

Such a method is adopted, thereby providing substrates for information recording media having an excellent coating layer compared with the conventional coating layers, namely, (1) a substrate for information recording media, composed of a resin material comprising the hydrogenated product of the aromatic vinyl polymer, and having a protective coating layer in which adhesion strength by a cross-cut peel test is at least 90%, and surface hardness (pencil hardness) is at least 2H, (2) the substrate for information recording media set forth in (1), wherein the protective coating layer is formed by coating the surface of the substrate with an ultraviolet-curing coating material comprising a reactive monomer and/or a reactive oligomer, and a photopolymerization initiator and irradiating the coated surface with ultraviolet rays, and (3) the substrate for information recording media set forth in (1) or (2), wherein the ultraviolet-curing coating material comprises at least one monomer selected from a long-chain aliphatic monofunctional acrylate monomer, an alicyclic monofunctional acrylate monomer and an alicyclic bifunctional acrylate monomer in an amount of at least 40% by weight.

<Surface Treatment>

In the present invention, the surface of the substrate may be subjected to various surface treatments such as plasma treatment, corona discharge treatment, treatment with an active gas, solvent etching treatment, microsandblasting treatment and chemical etching treatment in order to mainly improve the adhesion of the recording film layer and coating layer to the substrate.

<Other Processes and the Like>

In, for example, a digital video disk or laser disk, 2 disks formed in a half thickness may be used to laminate the disks on each other in such a manner that a recording film layer is located inside. A label or the like may also be further printed on the coating material by a screen process printing or the like. The respective processes recited in the present invention must be executed in order. However, other processes than these processes may also be added.

<Information Recording Medium>

An information recording medium is produced by such processes as described above. Information recording media according to the present invention include optically readable information recording media and the like. Specific examples thereof include media incapable of rewriting, such as music CD, CD-ROM and laser disks, which make good use of changes in reflected light by minute irregularities, and media capable of writing once or rewriting, such as CD-R, WORM (writ once optical disk), MD (rewritable optical disk; magneto-optical disk), MD (minidisk) and DVD (digital video disk), which make good use of changes in reflectance by functional coloring matter or phase change. With respect to an optical information recording medium disk having a conductive film layer formed of aluminum, gold, iron or the like, or a compound containing such a metal atom as, for example, a reflecting film layer, when a corona discharge treatment is intended after forming the conductive film layer, there has been a risk of discharge, and so such a treatment has been impossible. However, the production process according to the present invention is adopted, whereby scorch or burning by discharge is prevented, and so adhesive force between the respective layers can be improved. Therefore, such a production process is preferred.

<Optical Part>

The resin materials according to the present invention have sufficiently small birefringence and excellent mechanical strength and are excellent in moisture resistance, and molding and processing ability, and are hence suitable for use as not only the above-described substrates for information recording media, but also all optical parts of which these properties are required.

Examples of optical parts for which the molding materials according to the present invention can be used include the conventionally known optical parts which can be molded from plastics, such as optical lenses, prisms, mirrors, medical inspection cells, light guide plates and optical films. More specifically, the optical parts are used in a wide variety of application fields, such as whole beam transmission type lenses such as image pickup system lenses in a camera, image pickup system lenses in a video camera, microscope lenses, endoscope lenses, telescope lenses, binocular lenses, spectacle lenses and magnifying lenses; pickup lenses for optical disks such as CD, CD-ROM, WORM (writ once optical disk), MO (rewritable optical disk; magneto-optical disk) and MD (minidisk); lenses in a laser scanning system, such as fθ lens and sensor lens for a laser beam printer; and prisms lens in a finder system of a camera. Examples of the optical parts according to the present invention also include optical lenses such as infrared sensor lenses, auto-focus lenses and band-pass filter lenses, with the above-described absorbent, dye and/or pigment incorporated therein; optical mirrors; prisms; light guide plates for liquid crystal display devices and the like; various kinds of inspection cells, such as medical blood inspection cells; and optical films such as deflecting films, phase difference films and light diffusion films.

The moldings according to the present invention are suitable for use as various kinds of medical transparent moldings of which a repeated steam sterilization treatment, which is conducted under severer high-temperature and high-humidity conditions, is required. Specific examples thereof include containers for liquid, powdery or solid chemicals such as container for liquid chemicals for injection, ampoules, prefilled syringes, transfusion bags, containers for solid chemicals, containers for eye drops and container for drops; sample containers such as sampling test tubes for blood inspection, bleeding test tubes and specimen containers; medical devices such as injectors; sterilizing containers for sterilizing medical devices; and medical optical parts such as plastic lenses for drug inspection. The resin materials according to the present invention are also suitable for use as insulating materials, hardware for treatment of semiconductors, etc.

Among the resin materials according to the present invention, those comprising a hydrogenated polymer, wherein the content of foreign matter having a particle diameter of at least 0.5 μm in the hydrogenated polymer is extremely low, have small birefringence and excellent mechanical strength and are excellent in moisture resistance, and molding and processing ability, and are hence suitable for use in various kinds of optical parts. Among the optical parts, use application to optical lenses are preferred. In particular, the hydrogenated polymers with an antioxidant blended with a solution of such a polymer are particularly suitable for use as optical lenses.

The optical lenses according to the present invention can be improved in optical properties, chemical resistance, wear resistance, moisture permeability, etc. by providing a hard coating layer formed of an inorganic compound, organic silicone compound such as a silane coupling agent, acrylic monomer, vinyl monomer, melamine resin, epoxy resin, fluororesin, silicone resin, or the like on the surfaces thereof by a method such as heat, curing, ultraviolet curing, vacuum deposition, sputtering or ion plating.

The resin materials comprising a hydrogenated polymer, wherein the content of foreign matter having a particle diameter of at least 0.5 μm in the hydrogenated polymer is extremely low, are excellent in properties such as transparency, heat resistance, water resistance and resistance to acids and alkalis and moreover have a feature that the content of foreign matter is low, and are hence also suitable for use as moldings, such as carriers such as IC carriers, wafer carriers, information recording medium carriers, carrier tapes and wafer shippers; lids thereof; materials for ultrapure water systems such as containers for ultrapure water and piping materials for ultrapure water; hardware for treatment of semiconductors, such as joints for piping, containers for liquid chemicals and cleaning tanks. More specifically, when the moldings according to the present invention are used in various hardware used in production processes of integrated circuits, such as storage.shipment, surface treatment, etching treatment with a liquid chemical and ultrasonic cleaning treatment of silicon wafers, failure in products by fine foreign matter can be prevented even when they are used in production of extremely integrated semiconductors such as ultra LSI and ULSI, since occurrence of finely particulate foreign matter is extremely little.

EXAMPLES

The present invention will hereinafter be described more specifically by the following Preparation Examples, Examples, Comparative Examples and Referential Examples. All designations of "part" or "parts" and "%" as will be used in these examples mean part or parts by weight and % by weight unless expressly noted.

Various physical properties were determined in accordance with the following methods:

(1) The molecular weight of a polymer sample was measured by GPC using toluene as a solvent to find a weight average molecular weight (Mw) in terms of a standard polystyrene.

(2) The molecular weight distribution of a polymer sample was determined by finding a weight average molecular weight (Mw) and a number average molecular weight (Mn) in terms of standard polystyrene values as measured by GPC using toluene as a solvent, and calculating out a ratio (Mw/Mn) between both values.

(3) The amount of a component having a molecular weight of at most 10,000 in a polymer sample was determined as an integrated amount of a component having a molecular weight (M) of at most 10,000 in terms of standard polystyrene as measured by GPC using toluene as a solvent.

(4) The hydrogenation rate of aromatic rings was determined by $^1$H-NMR measurement and calculated out.

(5) The birefringence value of an optical disk substrate sample was evaluated as a birefringence value at a position 25 mm away from the center of an optical disk substrate 85 mm in diameter. The birefringence value was measured by a polarizing microscope (manufactured by NIKON CORP.; 546 nm Senarmont compensator). The sample was ranked as ⊚ where the birefringence value was not greater than 5 nm, ○ where the birefringence value was greater than 5 nm, but not greater than 10 nm, or X where the birefringence value was greater than 10 nm.

(6) The flexural strength of a molding sample was determined by using an injection molded specimen having a length of 127 mm, a width of 12.7 mm and a thickness of 3 mm by means of a Strograph (manufactured by Toyo Seiki Seisaku-Sho, Ltd.; V10-B) in accordance with ASTM D 790. The sample was ranked as ⊚ where the yield strength or breaking strength was at least 500 kgf/cm$^2$, ○ where the breaking strength was lower than 500 kgf/cm$^2$, but not lower than 400 kgf/cm$^2$, or X where the breaking strength was lower than 400 kgf/cm$^2$.

(8) The observation of surface imperfection on an optical disk substrate sample was conducted through an AFM (atomic force microscope; manufacture by Seiko Instruments Inc.; SPI3700/SPA-250) to determine the number of depressed defects 0.3 μm or greater in length or width and 10 nm or greater in depth by observing an area portion of 5 μm×5 μm at 50 positions on the surface on the signal pattern side.

(9) The high-temperature and high-humidity test I was carried out by holding an optical disk substrate sample for 100 hours under an environment of 50° C. in temperature and 80% in relative humidity in a thermo-hygrostatic tester and then rapidly taking the sample out in a room temperature environment (out of the tester) to measure a light transmittance at a wavelength of 830 nm after leaving the sample to stand for 1 hour in the room. The result was determined as a difference in light transmittance before and after holding the sample under the high-temperature and high-humidity environment.

(10) The high-temperature and high-humidity test II was carried out in the same manner as in the high-temperature and high-humidity test I except that the conditions within the thermo-hygrostatic tester were changed to a temperature of 60° C. and a relative humidity of 90%.

(11) The haze (haze value) of an optical disk sample was determined by means of a color difference-turbidity meter (manufactured by Nippon Denshoku Kogyo K.K.; COH-300A), in accordance with JIS K 7105.

(12) Content of foreign matter having a particle diameter of at least 0.5 μm:

A hydrogenated polymer sample was dissolved in purified toluene to prepare a solution at a concentration of 1.5% to determine the number of particles having a particle diameter of at least 0.5 μm by means of a light scattering type fine particle detector (KS-58; manufactured by Rion Co., Ltd.).

(13) Bit error rate of optical disk:

① After molding an optical disk substrate sample, a 3-layer film (the film thickness: 500 angstroms for each layer) composed of $Si_3N_4/TbFeCo/Si_3N_4$ was formed as a recording film on the substrate by means of an RF magnetron sputtering system manufactured by ULVAC JAPAN Ltd. to obtain a magneto-optical disk. ② The bit error rate of this disk was determined under the following conditions:

| | |
|---|---|
| Write laser power: | 5.5 mW |
| Reproduction laser power: | 1.0 mW |
| Number of revolutions of disk: | 1800 rpm |
| Carrier frequency: | 2 MHz |
| Magnetic field applied: | 300 Oe |
| Laser wavelength: | 830 nm. |

Preparation Example 1

Preparation of Hydrogenated Product A of Aromatic Vinyl Polymer

A stainless steel-made reactor equipped with a stirrer, which had been sufficiently dried and purged with nitrogen, was charged with 960 parts of dehydrated cyclohexane, 240 parts of a styrene monomer and 3.81 parts of dibutyl ether. While stirring the resultant mixture at 40° C., 0.65 parts of a n butyllithium solution (a hexane solution containing 15% of n-butyllithium) were added to initiate polymerization. After the polymerization was conducted for 3 hours under the same conditions, 1.26 parts of isopropyl alcohol were added to terminate the reaction. The weight average molecular weight (Mw) and molecular weight distribution (Mw/Mn) of Aromatic Vinyl Polymer a thus prepared were measured and found to be 180,000 in Mw, 1.04 in Mw/Mn and 0.0% in content of a component having a molecular weight of at most 10,000.

Incidentally, the expression "0.0% in content of a component" means that the content of the component having a molecular weight of at most 10,000 is lower than the limit of detection (the same shall apply hereinafter).

The polymer solution (1,200 parts) containing Aromatic Vinyl Polymer a described above was then transferred to a pressure reaction vessel equipped with a stirrer, and 24 parts of a nickel-diatomaceous earth catalyst. (product of Nikki Chemical Co., Ltd.; N113, amount of nickel supported: 40%) were added and mixed. After completion of the charging, the interior of the reaction vessel was purged with hydrogen gas to supply hydrogen at 150° C. while stirring the mixture to hold the contents under a hydrogen pressure of 70 kg/cm², thereby conducting a hydrogenation reaction for 6 hours. After completion of the hydrogenation reaction, the hydrogenation catalyst was removed by filtration from the reaction solution, and 1,200 parts of cyclohexane were added to the filtrate to dilute it. Thereafter, the filtrate was further filtered through a filter having a pore size of 1 μm under an environment of air cleanliness class of class 1,000 to remove foreign matter. The filtrate thus obtained was poured into 9,000 parts of isopropanol filtered through a filter having a pore size of 1 μm under an environment of air cleanliness class of class 1,000 to deposit Hydrogenated Product A of the aromatic vinyl polymer. Hydrogenated Product A was isolated by filtration and then dried at 100° C. for 48 hours by a vacuum dryer to recover Hydrogenated Product A of the aromatic vinyl polymer. The physical properties of the thus-obtained Hydrogenated Product A were as follows:

Mw=153,000, Mw/Mn=1.09, content of a component having a molecular weight of at most 10,000=0.0%, and hydrogenation rate: 100.0%.

Preparation Example 2

Preparation of Hydrogenated Product B of Aromatic Vinyl Polymer

Hydrogenated Product B of an aromatic vinyl polymer was prepared in the same manner as in Preparation Example 1 except that the amount of the nickel-diatomaceous earth catalyst, the hydrogenation reaction temperature, the. pressure and the reaction time were changed to 16.8 parts, 160° C., 60 kg/cm² and 8 hours, respectively. The physical properties of the thus-obtained Hydrogenated Product B were as follows:

Mw=122,000, Mw/Mn=1.17, content of a component having a molecular weight of at most 10,000=0.1%, and hydrogenation rate: 99.9%.

Preparation Example 3

Preparation of Hydrogenated Product C of Aromatic Vinyl Polymer

Aromatic Vinyl Polymer c was prepared in the same manner as in Preparation Example 1 except that the amounts of dibutyl ether and the n-butyllithium solution (a hexane solution containing 15% of n-butyllithium) were changed to 3.36 parts and 0.57 parts, respectively. The weight average molecular weight (Mw) and molecular weight distribution (Mw/Mn) of Aromatic Vinyl Polymer c were measured and found to be 204,000 in Mw, 1.10 in Mw/Mn and 0.0% in content of a component having a molecular weight of at most 10,000.

The polymer solution (1,200 parts) containing Aromatic Vinyl Polymer c thus obtained was then transferred to the same pressure reaction vessel as that used in Preparation Example 1, and 24 parts of the same nickel-diatomaceous earth catalyst as that used in Preparation Example 1 were added and mixed. Hydrogenated Product C of the aromatic vinyl polymer was prepared in the same manner as in Preparation Example 1 except that the hydrogenation reaction temperature and the reaction time were changed to 160° C. and 8 hours, respectively. The physical properties of the thus-obtained Hydrogenated Product C were as follows:

Mw=152,000, Mw/Mn=1.26, content of a component having a molecular weight of at most 10,000=0.3%, and hydrogenation rate: 99.4%.

Preparation Example 4

Preparation of Hydrogenated Product D of Aromatic Vinyl Polymer

Hydrogenated Product D of an aromatic vinyl polymer was prepared in the same manner as in Preparation Example 3 except that the pressure in the hydrogenation reaction and the reaction time were changed to 50 kg/cm$^2$ and 10 hours, respectively. The physical properties of the thus-obtained Hydrogenated Product D were as follows:

Mw=140,000, Mw/Mn=1.67, content of a component having a molecular weight of at most 10,000=1.2%, and hydrogenation rate: 99.9%.

Preparation Example 5

Preparation of Hydrogenated Product E of Aromatic Vinyl Polymer

Hydrogenated Product E of an aromatic vinyl polymer was prepared in the same manner as in Preparation Example 3 except that 24 parts of a nickel-alumina catalyst (product of Nikki Chemical Co., Ltd.; N163, amount of nickel supported: 40%) were used in place of the nickel-diatomaceous earth catalyst, and the hydrogenation reaction temperature and pressure were changed to 230° C. and 45 kg/cm$^2$, respectively. The physical properties of the thus-obtained Hydrogenated Product E were as follows:

Mw 132,000, Mw/Mn=1.82, content of a component having a molecular weight of at most 10,000=2.1%, and hydrogenation rate: 99.0%.

Preparation Example 6

Preparation of Hydrogenated Product F of Aromatic Vinyl Polymer

The same reactor as that used in Preparation Example 1 was charged with 280 parts of dehydrated cyclohexane, 280 parts of dehydrated toluene and 240 parts of a styrene monomer. While stirring the resultant mixture at 40° C., 0.12 parts of azobisisobutyronitrile were added to initiate polymerization. The reaction of the reaction system was heated to 70° C. to conduct polymerization for 24 hours. After the reaction, the weight average molecular weight (Mw) and molecular weight distribution (Mw/Mn) of Aromatic Vinyl Polymer f thus prepared were measured and found to be 161,000 in Mw, 2.30 in Mw/Mn and 0.8% in content of a component having a molecular weight of at most 10,000.

To the solution of Polymer f were added 400 parts of dehydrated cyclohexane to dilute the solution, and 28.8 parts of the same nickel-alumina catalyst as that used in Preparation Example 5 were added and mixed. Hydrogenated Product F of the aromatic vinyl polymer was prepared in the same manner as in Preparation Example 1 except that the hydrogenation reaction temperature, pressure and reaction time were changed to 230° C., 45 kg/cm$^2$ and 8 hours, respectively. The physical properties of the thus-obtained Hydrogenated Product F were as follows:

Mw 116,000, Mw/Mn=2.63, content of a component having a molecular weight of at most 10,000=3.4%, and hydrogenation rate: 98.1%.

Preparation Example 7

Preparation of Hydrogenated Product G of Aromatic Vinyl Polymer

Aromatic Vinyl Polymer g was prepared in the same manner as in Preparation Example 6 except that the amount of azobisisobutyronitrile, and the reaction temperature and reaction time were changed to 0.10 parts, 60° C. and 48 hours, respectively. The weight average molecular weight (Mw) and molecular weight distribution (Mw/Mn) of Aromatic Vinyl. Polymer g were measured and found to be 195,000 in Mw, 1.80 in Mw/Mn and 0.5% in content of a component having a molecular weight of at most 10,000.

Hydrogenated Product G of the aromatic vinyl polymer was prepared in the same manner as in Preparation Example 6 except that 72 parts of a ruthenium-carbon catalyst (product of N E Chemcat Co.; amount of ruthenium supported: 5%) were added and mixed in place of the nickel-alumina catalyst, and the hydrogenation reaction temperature and reaction time were changed to 170° C. and 10 hours, respectively. The physical properties of the thus-obtained Hydrogenated Product G were as follows:

Mw=79,000, Mw/Mn=1.65, content of a component having a molecular weight of at most 10,000=1.9%, and hydrogenation rate: 98.5%.

Preparation Example 8

Preparation of Hydrogenated Product H of Aromatic Vinyl Polymer

Hydrogenation was conducted in the same manner as in Preparation Example 5 except that the hydrogenation reaction temperature was changed to 160° C. and the hydrogenation reaction was conducted for 5 hours under a pressure of 30 kg/cm$^2$ and successively for 5 hours under a more raised pressure of 60 kg/cm$^2$, thereby preparing Hydrogenated Product H of an aromatic vinyl polymer. The physical properties of the thus-obtained Hydrogenated Product H were as follows:

Mw=106,000, Mw/Mn=1.58, content of a component having a molecular weight of at most 10,000=2.4%, and hydrogenation rate: 99.6%.

Preparation Example 9

Preparation of Hydrogenated Product I of Aromatic Vinyl Polymer

Hydrogenation was conducted in the same manner as in Preparation Example 2 except that the hydrogenation reaction time was changed to 5 hours, thereby preparing Hydrogenated Product I of an aromatic vinyl polymer. The physical properties of the thus-obtained Hydrogenated Product I were as follows:

Mw=137,000, Mw/Mn=1.12, content of a component having a molecular weight of at most 10,000=0.1%, and hydrogenation rate: 95.0%.

The physical properties of the hydrogenated polymers obtained in the above Preparation Examples were shown in Table 1.

TABLE 1

| | Polystyrene | | | Hydrogenation conditions | | | | | Hydrogenated polymer | | | | |
|---|---|---|---|---|---|---|---|---|---|---|---|---|---|
| Prepn. Ex. | Mw | Mw/Mn | Content of component having M ≤10,000, wt. % | Catalyst | Amount of catalyst/ amount of polymer | Temp. °C. | Pressure kgf/cm² | Reaction time h | Mw | Mw/Mn | Content of component having M ≤10,000, wt. % | Hydrogenation rate % | Polymer code |
| 1 | 180,000 | 1.04 | 0.0 | Ni-diatomite | 0.10 | 150 | 70 | 6 | 153,000 | 1.09 | 0.0 | 100.0 | A |
| 2 | 180,000 | 1.04 | 0.0 | Ni-diatomite | 0.07 | 160 | 60 | 8 | 122,000 | 1.07 | 0.1 | 99.9 | B |
| 3 | 204,000 | 1.10 | 0.0 | Ni-diatomite | 0.10 | 160 | 70 | 8 | 152,000 | 1.26 | 0.3 | 99.4 | C |
| 4 | 204,000 | 1.10 | 0.0 | Ni-diatomite | 0.10 | 160 | 50 | 10 | 140,000 | 1.67 | 1.2 | 99.9 | D |
| 5 | 204,000 | 1.10 | 0.0 | Ni-alumina | 0.10 | 230 | 45 | 8 | 132,000 | 1.82 | 2.1 | 99.0 | E |
| 6 | 161,000 | 2.30 | 0.8 | Ni-alumina | 0.12 | 230 | 45 | 8 | 116,000 | 2.63 | 3.4 | 98.1 | F |
| 7 | 195,000 | 1.80 | 0.5 | Ru-carbon | 0.30 | 170 | 45 | 10 | 79,000 | 1.65 | 1.9 | 98.5 | G |
| 8 | 204,000 | 1.10 | 0.0 | Ni-alumina | 0.10 | 160 | 30/60 | 5/5 | 106,000 | 1.58 | 2.4 | 99.6 | H |
| 9 | 180,000 | 1.04 | 0.0 | Ni-diatomite | 0.07 | 160 | 60 | 5 | 137,000 | 1.12 | 0.1 | 95.0 | I |

Examples 1 to 4

To each 100 parts of Hydrogenated Products A to D of the aromatic vinyl polymers prepared in Preparation Examples 1 to 4 were added 0.1 parts of a soft polymer. (Toughtec H1052, product of Asahi Chemical Industry Co., Ltd.) and 0.1 parts of an antioxidant (Irganox 1010, product of CIBA-GEIGY AG), and the resultant mixtures were separately kneaded in a twin-screw kneader (TEM-35B, manufactured by Toshiba Machine Co., Ltd.; screw diameter: 37 mm, L/D: 32, screw speed: 150 rpm, resin temperature: 240° C., feed rate: 15 kg/hour) and extruded into a strand. This strand was cooled with water and chopped by a pelletizer to prepare pellets.

Four pellet samples thus obtained were dried at 70° C. for 2 hours by means of a hot-air dryer circulated with air to remove water, and injection molding was conducted with a resin temperature and a mold temperature preset to 300° C. and 100° C., respectively, by means of an injection molding machine (manufactured by Sumitomo Heavy Industries, Ltd.; DISC-3) and a mold equipped with a stamper for optical disk, thereby obtaining optical disk substrates having a diameter of 85 mm.

The birefringence values of the optical disk substrates thus obtained were all not greater than 5 nm, and ranked as ⊚. The surface of each substrate on which a signal pattern had been formed by the stamper was observed through a microscope. As a result, no abnormality was observed in any case. The surface of each substrate on which the signal pattern had been formed was observed through an AFM. As a result, no depressed defects 0.3 μm or greater in length or width and 10 nm or greater in depth was found. The optical disk substrates were subjected to high-temperature and high-humidity tests I and II to determine changes in light transmittance. However, no change was observed. The evaluation results are shown collectively in Table 2.

The four pellet samples described above were separately used to conduct injection molding with a resin temperature and a mold temperature preset to 300° C. and 100C, respectively, by means of an injection molding machine (AUTOSHOTC MODEL 30A; manufactured by Fanac K.K.), thereby molding specimens each having a length of 127 mm, a width of 12.7 mm and a thickness of 3 mm. The flexural strength of each specimen was at least 500 kgf/cm² and ranked as ⊚. The evaluation results are shown in Table 2.

Example 5

To 100 parts of Hydrogenated Product A of the aromatic vinyl polymer prepared in Preparation Example 1 were added 0.5 parts of poly(oxy-2-hydroxy-trimethylene) nonylphenyl ether of a structure that one molecule of nonylphenol was reacted with two molecules of glycidol

HO[CH$_2$CH(OH)CH$_2$O]$_n$C$_6$H$_4$C$_9$H$_{19}$ wherein n is a natural number and 2 in terms of the average value of the whole molecule, as a partially etherified compound, and 0.1 parts of an antioxidant (Irganox 1010, product of CIBA-GEIGY AG), and the resultant mixture was kneaded in a twin-screw kneader and extruded in the same manner as in Example 1 to prepare pellets.

The pellets thus obtained were used to conduct evaluation in the same manner as in Example 1. The birefringence value of the optical disk substrate thus obtained was not greater than 5 nm, and ranked as ⊚. No abnormality was found by observation of the surface through a microscope. No defect was found even by observation through an AFM. No changes in light transmittance by high-temperature and high-humidity tests I and II were also observed. The flexural strength of a specimen was at least 500 kgf/cm² and ranked as ⊚. The evaluation results are shown in Table 2.

Example 6

To 100 parts of Hydrogenated Product B of the aromatic vinyl polymer prepared in Preparation Example 2 were added 0.5 parts of poly(oxy-2-hydroxy-trimethylene) nonylphenyl ether of a structure that one molecule of nonylphenol was reacted with 2.5 molecules of glycidol

HO[CH$_2$CH(OH)CH$_2$O]$_n$C$_6$H$_4$C$_9$H19 wherein n is a natural number and 2.5 in terms of the, average value of the whole molecule, as a partially etherified compound, and 0.1 parts of an antioxidant (Irganox 1010, product of CIBA-GEIGY AG), and the resultant mixture was kneaded in a twin-screw kneader and extruded in the same manner as in Example 1 to prepare pellets.

The pellets thus obtained were used to conduct evaluation in the same manner as in Example 1. The birefringence value of the optical disk substrate thus obtained was not greater than 5 nm, and ranked as ⊚. No abnormality was found by observation of the surface through a microscope. No defect was found even by observation through an AFM. No changes in light transmittance by high-temperature and high-humidity tests I and II were also observed. The flexural strength of a specimen was at least 500 kgf/cm² and ranked as ⊚. The evaluation results are shown in Table 2.

Example 7

To 100 parts of Hydrogenated Product C of the aromatic vinyl polymer prepared in Preparation Example 3 were added 0.5 parts of behenic acid monoglyceride [$CH_3(CH_2)_{20}COOCH_2(CHOH)CH_2OH$] of a structure that one molecule of behenic acid was reacted with one molecule of glycerol, as a partially esterified compound, and 0.1 parts of an antioxidant (Irganox 1010, product of CIBA-GEIGY AG), and the resultant mixture was kneaded in a twin-screw kneader and extruded in the same manner as in Example 1 to prepare pellets.

The pellets thus obtained were used to conduct evaluation in the same manner as in Example 1. The birefringence value of the optical disk substrate thus obtained was not greater than 5 nm, and ranked as ⊚. No abnormality was found by observation of the surface through a microscope. No defect was found even by observation through an AFM. No changes in light transmittance by high-temperature and high-humidity tests I and II were also observed. The flexural strength of a specimen was at least 500 kgf/cm² and ranked as ⊚. The evaluation results are shown in Table 2.

Example 8

To 100 parts of Hydrogenated Product D of the aromatic vinyl polymer prepared in Preparation Example 4 were added 0.7 parts of pentaerythritol monostearate [$CH_3(CH_2)_{16}COOCH_2C(CH_2OH)_4$] of a structure that one molecule of stearic acid was reacted with one molecule of pentaerythritol, as a partially esterified compound, and 0.1 parts of an antioxidant (Irganox 1010, product of CIBA-GEIGY AG), and the resultant mixture was kneaded in a twin-screw kneader and extruded in the same manner as in Example 1 to prepare pellets.

The pellets thus obtained were used to conduct evaluation in the same manner as in Example 1. The birefringence value of the optical disk substrate thus obtained was not greater than 5 nm, and ranked as ⊚. No abnormality was found by observation of the surface through a microscope. No defect was found even by observation through an AFM. No changes in light transmittance by high-temperature and high-humidity tests I and II were also observed. The flexural strength of a specimen was at least 500 kgf/cm² and ranked as ⊚. The evaluation results are shown in Table 2.

Examples 9 to 12

To each 100 parts of Hydrogenated Products A, B, E and H of the aromatic vinyl polymers prepared in Preparation Examples 1, 2, 5 and 8 were added only 0.1 parts of an antioxidant (Irganox 1010, product of CIBA-GEIGY AG), and the resultant mixtures were separately kneaded in a twin-screw kneader and extruded in the same manner as in Example 1 to prepare pellets.

The pellets thus obtained were used to conduct evaluation in the same manner as in Example 1. The results are shown in Table 2.

Comparative Examples 1 to 3

To each 100 parts of Hydrogenated Products F, G and I of the aromatic vinyl polymers prepared in Preparation Examples 6, 7 and 9 were added only 0.1 parts of an antioxidant (Irganox 1010, product of CIBA-GEIGY AG), and the resultant mixtures were separately kneaded in a twin-screw kneader and extruded in the same manner as in Example 1 to prepare pellets.

The pellets thus obtained were used to conduct evaluation in the same manner as in Example 1. The birefringence values of the optical disk substrates thus obtained were 8 nm for Comparative Example 1 and not, greater than 5 nm for Comparative Example 2, and ranked as ◯ and ⊚, respectively. However, the birefringence value was 12 nm for Comparative Example 3 and ranked as X. No abnormality was found by observation of the surfaces of each substrate through a microscope. No defect was found by observation through an AFM in Comparative Examples 2 and 3. However, 5 defects were found in Comparative Example 1. No changes in light transmittance by the high-temperature and high-humidity test I were observed. However, in all the comparative examples, reduction of light transmittance by 9 to 20% was observed in the high-temperature and high-humidity test II in which the conditions were severer. In Comparative Example 3, the flexural strength of a specimen was at least 500 kgf/cm² and ranked as ⊚. In both Comparative Examples 1 and 2, however, the flexural strength was lower than 400 kgf/cm² and ranked as X. The results are shown in Table 2.

TABLE 2

| | | | | | | | | | | High-temperature high-humidity test I | High-temperature high-humidity test II |
|---|---|---|---|---|---|---|---|---|---|---|---|
| | | | Anti-oxidant | Anti-whitening agent | | Birefringence | Mechanical strength (flexural | Observation through microscope | Observation through AFM Number of surface | Percent reduction of light trans- | Percent reduction of light trans- |
| | Polymer code | Parts | (parts) | Kind | parts | (nm) | strength) | 100 power | defects | mittance (%) | mittance (%) |
| Ex. 1 | A | 100 | 0.1 | SEBS | 0.1 | ⊚ | ⊚ | Normal | 0/50 | 0 | 0 |
| Ex. 2 | B | 100 | 0.1 | SEBS | 0.1 | ⊚ | ⊚ | Normal | 0/50 | 0 | 0 |
| Ex. 3 | C | 100 | 0.1 | SEBS | 0.1 | ⊚ | ⊚ | Normal | 0/50 | 0 | 0 |

TABLE 2-continued

| | Polymer | | Anti-oxidant | Anti-whitening agent | | Birefringence | Evaluation of optical disk substrate | | | | |
|---|---|---|---|---|---|---|---|---|---|---|---|
| | | | | | | | Mechanical strength (flexural | Observation through microscope | Observation through AFM Number of surface | High-temperature high-humidity test I Percent reduction of light trans- | High-temperature high-humidity test II Percent reduction of light trans- |
| | code | Parts | (parts) | Kind | parts | (nm) | strength) | 100 power | defects | mittance (%) | mittance (%) |
| Ex. 4 | D | 100 | 0.1 | SEBS | 0.1 | ⊚ | ⊚ | Normal | 0/50 | 0 | 0 |
| Ex. 5 | A | 100 | 0.1 | PGNPE (n = 2) | 0.5 | ⊚ | ⊚ | Normal | 0/50 | 0 | 0 |
| Ex. 6 | B | 100 | 0.1 | PGNPE (n = 2.5) | 0.5 | ⊚ | ⊚ | Normal | 0/50 | 0 | 0 |
| Ex. 7 | C | 100 | 0.1 | GMB | 0.5 | ⊚ | ⊚ | Normal | 0/50 | 0 | 0 |
| Ex. 8 | D | 100 | 0.1 | PEDS | 0.7 | ⊚ | ⊚ | Normal | 0/50 | 0 | 0 |
| Ex. 9 | A | 100 | 0.1 | — | — | ⊚ | ⊚ | Normal | 0/50 | 0 | −10 |
| Ex. 10 | B | 100 | 0.1 | — | — | ⊚ | ⊚ | Normal | 0/50 | 0 | −12 |
| Ex. 11 | E | 100 | 0.1 | — | — | ⊚ | ○ | Normal | 2/50 | 0 | −12 |
| Ex. 12 | H | 100 | 0.1 | — | — | ⊚ | ○ | Normal | 3/50 | 0 | −17 |
| Comp. Ex. 1 | F | 100 | 0.1 | — | — | ○ | × | Normal | 5/50 | 0 | −9 |
| Comp. Ex. 2 | G | 100 | 0.1 | — | — | ⊚ | × | Normal | 0/50 | 0 | −20 |
| Comp. Ex. 3 | I | 100 | 0.1 | — | — | × | ⊚ | Normal | 0/50 | 0 | −10 |

<Molding Examples by Specific Molding Methods>

In the present invention, as the molding methods of a resin material as described in the detailed description, may be used a method of holding the interior of an injection molding machine at a low oxygen concentration state to mold a substrate, and a method of lowering a dissolved oxygen concentration in the resin material before the molding. These examples will hereinafter be described.

Example 13

Molding Under a Nitrogen Gas Atmosphere

An optical disk substrate was obtained in the same manner as in Example 12 except that the molding was conducted while feeding a nitrogen gas containing oxygen at a concentration of at most 0.1% by volume to a hopper part of the injection molding machine at a flow rate of 10 liters/min. The results of the evaluation of physical properties of the optical disk substrate thus obtained are shown below.

Incidentally, the evaluation was conducted in the same manner as in Examples 1 to 12, and the description of the evaluation results is also made in accordance with the same standards as in Examples 1 to 12. (The same shall apply to Examples 14 to 16.)

The mechanical strength (flexural strength) was ranked as ⊚.

The result of the observation through a microscope was "normal".

The result of the observation through an AFM was "0/50" in terms of the number of defects.

The molecular weight of the resin in the optical disk substrate after the molding in Example 12 was Mw=55,000, and Mw/Mn=2.08, while the molecular weight in this example was Mw=78,000, and the molecular weight distribution was Mw/Mn=1.82 even after the molding. Therefore, the reduction of molecular weight after the molding was little.

Example 14

Preliminary Drying Under a Nitrogen Gas Atmosphere

An optical disk substrate was obtained in the same manner as in Example 12 except that the resin pellets before molding were dried at 100° C. for 3 hours by means of a hot-air dryer the interior of which was filled with a nitrogen gas containing oxygen at a concentration of at most 0.1% by volume, and the resin pellets taken out of the dryer were allowed to cool for 1 hour under an environment of room temperature in air and then fed to a hopper of the molding machine.

The mechanical strength (flexural strength) was ranked as ⊚.

The result of the observation through a microscope was "normal".

The result of the observation through an AFM was "0/50" in terms of the number of defects.

The molecular weight of the resin in the optical disk substrate after the molding was Mw=76,000, and the molecular weight distribution was Mw/Mn=1.82.

Example 15

Preliminary Drying Under Reduced Pressure

An optical disk substrate was obtained in the same manner as in Example 12 except that the resin pellets before molding were dried at 0° C. and 1 Torr for 2 hours by means of a vacuum dryer, and the resin pellets taken out of the dryer were allowed to cool for 1 hour under an environment of room temperature in air and then fed to a hopper of the molding machine.

The mechanical strength (flexural strength) was ranked as

The result of the observation through a microscope was "normal".

The result of the observation through an AFM was "0/50" in terms of the number of defects.

The molecular weight of the resin in the optical disk substrate after the molding was Mw=79,000, and the molecular weight distribution was Mw/Mn=1.78.

Example 16

Preliminary Drying Under Nitrogen and Molding Under Nitrogen:

An optical disk substrate was obtained in the same manner as in Example 12 except that the resin pellets before molding were dried at 100° C. for 3 hours by means of a hot-air dryer the interior of which was filled with a nitrogen gas containing oxygen at a concentration of at most 0.1% by volume, and the resin pellets taken out of the dryer were immediately fed to a hopper of the molding machine to conduct molding while feeding a nitrogen gas containing oxygen at a concentration of at most 0.1% by volume to a hopper part of the injection molding machine at a flow rate of 10 1/ min.

The mechanical strength (flexural strength) was ranked as ⊚.

The result of the observation through a microscope was "normal".

The result of the observation through an AFM was "0/50" in terms of the number of defects.

The molecular weight of the resin in the optical disk substrate after the molding was Mw=91,000, and the molecular weight distribution was Mw/Mn=1.65.

<Use Examples of coating material>

In the present invention, a protective coating material is preferably used when the resulting substrate is used as an information recording medium. Examples where a protective coating material was used for an optical disk substrate according to the present invention will hereinafter be described.

Incidentally, the evaluation methods of the protective coating film are described below.

(1) The surface electric resistance value was measured in accordance with JIS K 6911.

(2) The evaluation of cure shrinkage was made in the following manner. A protective coating material was applied to one side of a disk substrate, dried and irradiated with ultraviolet rays to cure it. Thereafter, the surface on which the protective coating material had been provided was turned up to measure an angle of a straight line connecting the outer periphery of the substrate and the center of the substrate when the center of the substrate was fixed to a horizontal plane with the horizontal plane, thereby expressing the degree of cure shrinkage by this angle.

(3) The surface hardness (pencil hardness) was measured under a load of 1 kg in accordance with JIS K 5400.

(4) Evaluation of adhesion (cross-cut peel test):

Each 11 grooves were cut vertically and transversely 1 mm apart through a protective coating layer formed on the surface of a substrate by means of a cutter blade to form 100 1 mm squares cut into the coating layer. A cellophane adhesive tape (product of Sekisui Chemical Co., Ltd.) was applied over the cross-hatched area and then peeled in a direction of 90°, thereby expressing the number of squares, in which the protective coating layer was not pulled off, in terms of percentage.

(5) The high-temperature and high-humidity test was carried out by leaving an optical disk to stand for 500 hours under an environment of 65° C. in temperature and 90% in relative humidity in a thermo-hygrostatic tester and then taking the optical disk out of the tester to observe the condition of a metallic recording film.

Example 17

Ten parts by weight of n-butyl acrylate, 28 parts by weight of isoamyl acrylate, 30 parts by weight of trimethylolpropane triacrylate, 42 parts by weight of dipentaerythritol hexaacrylate and 5 parts by weight of a photopolymerization initiator (Irgacure 651, product of CIBA-GEIGY AG) were mixed with one another, and 2 parts by weight of a nonionic antistatic agent (Anstics SA-300, product of Toho Chemical Industry Co., Ltd.) and a fluorine-containing nonionic surfactant (Flolard FC-171, product Sumitomo 3M Limited) to 500 ppm were further added to prepare an ultraviolet-curing coating material.

A recording film layer was formed on the substrate obtained in Example 1 by means of ILC-3000 manufactured by ANELVA Corporation. The recording film layer was composed of SiN of 100 nm, TbFeCo of 30 nm, SiN of 40 nm and Al of 40 nm. No recording film layer was provided over a width of 1.0 mm at the outer periphery and a width of 2.0 mm outside a groove at the inner part thereof.

The ultraviolet-curing coating material obtained above was applied to the substrate obtained above by a spin coater (5,000 rpm, 10 seconds), and the coated substrate was left to stand for 10 minutes at room temperature to fully dry the coating material. The film thickness of the ultraviolet-curing coating material after the drying was 6 μm. This substrate was irradiated with ultraviolet rays (peak irradiation intensity on the surface of the substrate: 150 mW/cm$^2$; integrated quantity of light: 1,500 mJ/cm$^2$, irradiation time: 10 seconds) from a high pressure mercury lamp to cure the ultraviolet-curing coating material, thereby forming a hard coating layer.

The surface electric resistance value was 9.1×10$^{12}$ Ω. The degree of cure shrinkage was 3 mrad, and the hardness of the coated surface of the substrate was 3H in terms of pencil hardness. As a result of a warpage stress test, no crack was observed. The result of the cross-cut peel test was 98%, and 94% even after the high-temperature and high-humidity durability test at a temperature of 80° C. and a relative humidity of 90% for 500 hours. No abnormality was observed on the recording film layer after the high-temperature and high-humidity durability test.

Example 18

Five parts by weight of n-butyl acrylate, 32 parts by weight of isoamyl acrylate, 20 parts by weight of 20 neopentylglycol diacrylate, 48 parts by weight of dipentaerythritol hexaacrylate and 5 parts by weight of a photopolymerization initiator (Irgacure 651, product of CIBA-GEIGY AG) were mixed with one another, and a fluorine-containing nonionic surfactant (Flolard FC-171, product Sumitomo 3M Limited) was further added to 500 ppm to prepare a coating material. This ultraviolet-curing coating material was used to form a coating layer in the same manner as in Example 17.

The surface electric resistance value was 3.3×10$^{15}$ Ω. The degree of cure shrinkage was 4 mrad, and the hardness of the coated surface of the substrate was 3H in terms of pencil hardness. No crack was observed even when warpage stress was applied to the substrate. The result of the cross-cut peel test was 95%, and 94% even after the high-temperature and high-humidity durability test at a temperature of 80° C. and a relative humidity of 90% for 500 hours. No abnormality was observed on the recording film layer after the high-temperature and high-humidity durability test.

Referential Example 1

A coating layer was formed on the substrate in the same manner as in Example 17 except that a commercially available acrylic coating material (SD-17, product of Dainippon Ink & Chemicals, Incorporated) was used as an ultraviolet-curing coating material.

The surface electric resistance value was $5.3\times10^{15}$ Ω. The degree of cure shrinkage was 3 mrad, and the hardness of the coated surface of the substrate was 2H in terms of pencil hardness. As a result of a warpage stress test, no crack was observed in the substrate. The result of the cross-cut peel test was 61%, and 21% after the high-temperature and high-humidity durability test at a temperature of 80° C. and a relative humidity of 90% for 500 hours. After the high-temperature and high-humidity test, it was confirmed that corrosion occurred on the recording film layer.

<Use Examples of Hhydrogenated Polymer Containing Little Foreign Matter>

Example 19

Filtration Process:

To a solution containing Hydrogenated Product A obtained in Example 1 was added pentaerythrimethyl-tetrakis[3-(3,5-di-t-butyl-4-hydroxyphenyl) propionate] as an antioxidant in a proportion of 0.02 parts per 100 parts of polymer solids to dissolve it. This solution was filtered through a metal fiber-made filter (pore size: 0.5 μm product of Nichidai K.K.). The filtrate was then filtered through a Zeta Plus filter 3OS (pore size: 0.5 to 1 μm, product of Cuno Co.) and further filtered through a metal fiber-made filter (pore size: 0.2 μm, product of Nichidai K.K.) to remove foreign matter.

Concentrating and Drying Process:

The filtrate (polymer concentration 20%) obtained above was first heated to 250° C. by a preliminary heater as a first stage for removal of a volatile component, and continuously fed to a drum type concentration dryer (manufactured by Hitachi Ltd.) under a pressure of 3.0 MPa. The operating conditions of the concentration dryer were controlled in such a manner that pressure was 60 kPa and the temperature of the polymer solution concentrated within the dryer reached 260° C. The concentrated solution as continuously discharged from the concentration dryer. he concentration of the concentrated polymer solution was 96%.

As a second stage for removal of the volatile component, the polymer solution was fed to a concentration dryer of the same type under a pressure of 1.5 MPa while keeping the temperature of the polymer solution at 260° C. The operating conditions of the concentration dryer were controlled to a pressure of 1.5 kPa and a temperature of 270° C. The polymer in a molten state was continuously discharged from the concentration dryer and extruded through a die in a clean room controlled to class 100, cooled with water and then cut by means of a pelletizer (OSP-2, manufactured by Nagata Seisakusho Co., Ltd.) to obtain pellets (cyclic hydrocarbon polymer). The pellets were charged into a stainless steel-made closed container the surface of which had been polished to store them.

A solution with the pellets dissolved in chlorobenzene was used to conduct analysis by a gas chromatograph (G-3000, manufactured by Hitachi Ltd.; limit of detection: 10 ppm). As a result, the content of the volatile component was found to be 150 ppm.

The pellets were used to measure the weight average molecular weight (Mw) and molecular weight distribution (Mw/Mn) of the polymer. As a result, Mw is 150,000, and Mw/Mn was 1.10. Toluene filtered and purified through a cartridge filter having a pore size of 0.2 μm was used to dissolve the pellets therein, thereby preparing a solution at a concentration of 1.5% to determine the number of foreign particles having a particle diameter of at least 0.5 μm by means of a light scattering type fine particle detector (KS-58; manufactured by Rion Co., Ltd.). As a result, it was found that $2.1\times10^3$ foreign particles were contained in 1 g of the pellets.

Optical Lens:

The pellets were fed to an injection molding machine (AUTOSHOTC MODEL 30A; manufactured by Fanac K.K.) to mold an aspherical pickup lenses for CD player each having an effective diameter of 4.5 mm, a thickness of 3.4 mm and a focal length of 4.5 mm at a clamping force of 30 t, a resin temperature of 260° C., a mold temperature of 100° C. and an injection pressure of 900 kg/cm². The residence time (at a resin temperature of 250° C. or higher) of the resin within a cylinder of the injection molding machine was controlled to 25 minutes. The light transmittance at 780 nm of the lens thus obtained was at least 91%. The haze value of this lens was 0.1%.

Optical Disk Substrate:

The pellets described above were fed to an injection molding machine (manufactured by Sumitomo Heavy Industries, Ltd.; DISC-3), and a mold equipped with a stamper for optical disk was used to conduct injection molding with a resin temperature and a mold temperature preset to 300° C. and 100° C., thereby producing an optical disk substrate having a diameter of 85 mm. This optical disk substrate was used to determine a bit error rate. As a result, it was found to be at most $1\times10^{-5}$.

Example 20

An operation was conducted in the same manner as in Example 19 except that in the filtration process in Example 19, the polymer solution was filtered through a metal fiber-made filter (pore size: 0.5 am, product of Nichidai K.K.), and the filtrate was then filtered through a Zeta Plus filter 3OS (pore size: 0.5 to 1 μm, product of Cuno Co.) and further filtered through a metal fiber-made filter (pore size: 0.5 μm, product of Nichidai K.K.). The results are shown in Table 3.

Example 21

An operation was conducted in the same manner as in Example 19 except that in the filtration process in Example 19, the polymer solution was filtered through a metal fiber-made filter (pore size: 0.5 μm, product of Nichidai K.K.), and the filtrate was then filtered through a metal fiber-made filter (pore size: 0.5 μm, product of Nichidai K.K.) and further filtered through a Zeta Plus filter 3OS (pore size: 0.5 to 1 μm, product of Cuno Co.).

The results are shown in Table 3.

Example 22

An operation was conducted in the same manner as in Example 19 except that in the filtration process in Example 19, the polymer solution was filtered through a metal fiber-made filter (pore size: 0.5 μm, product of Nichidai K.K.), and the filtrate was then filtered through a metal fiber-made filter (pore size: 0.2 μm, product of Nichidai K.K.). The results are shown in Table 3.

Example 23

An operation was conducted in the same manner as in Example 19 except that in the filtration process in Example 19, the polymer solution was filtered through a metal fiber-made filter (pore size: 0.5 μm, product of Nichidai K.K.), and the filtrate was then filtered through a metal fiber-made filter (pore size: 0.2 μm, product of Nichidai K.K.) and further filtered through a metal fiber-made filter (pore size: 0.2 μm, product of Nichidai K.K.). The results are shown in Table 3.

Referential Example 2

An operation was conducted in the same manner as in Example 19 except that in the filtration process in Example 19, the polymer solution was filtered through a metal fiber-made filter (pore size: 0.5 μm, product of Nichidai K.K.), and the filtrate was then filtered through a metal fiber-made filter (pore size: 0.5 μm, product of Nichidai K.K.). The results are shown in Table 3.

Referential Example 3

A solution containing Hydrogenated Product A obtained in Preparation Example 1 was filtered through a metal fiber-made filter (pore size: 0.5 μm, product of Nichidai K.K.). The filtrate was then filtered through a Zeta Plus filter 30S (pore size: 0.5 to 1 μm, product of Cuno Co.) and further filtered through a metal fiber-made filter (pore size: 0.2 μm, product of Nichidai K.K.) to remove foreign matter. Into 300 parts of isopropyl alcohol, were poured 100 parts of this solution, and the mixture was stirred to deposit the hydrogenated product. The hydrogenated product deposited and the solvent were separated from each other through a 400-mesh stainless steel filter. The hydrogenated product recovered was dried at 120° C. and 0.1 kPa or lower for 24 hours by a vacuum dryer placed in a clean room to obtain a hydrogenated product. Into 100 parts of the hydrogenated product thus obtained were incorporated 0.05 parts of the same antioxidant as that used in Example 1, and the resultant mixture was melted and extruded at 240° C. by a single-screw extruder (SV-40, manufactured by Tanabe Plastic Kikai K.K.) having a screw diameter of 40 mm. The extrudate was cut by a pelletizer to obtain pellets. An optical lens and an optical disk substrate were produced in the same manner as in Example 19 except that this pellet sample was used, and evaluated. The results are shown in Table 3.

Referential Example 4

Filtration, and concentration and drying were conducted in the same manner as in Example 19 except that no antioxidant was added to the solution containing Hydrogenated Product A obtained in Preparation Example 1. Into 100 parts of the hydrogenated product thus obtained were incorporated 0.05 parts of the same antioxidant as that used in Example 1, and the resultant mixture was melted and extruded at 240° C. by a twin-screw extruder (TEM-35B, manufactured by Toshiba Machine Co., Ltd.) having a screw diameter of 37 mm. The extrudate was cut by a pelletizer to obtain pellets. An optical lens and an optical disk substrate were produced in the same manner as in Example 19 except that this pellet sample was used, and evaluated. The results are shown in Table 3.

TABLE 3

| | Filtration method of solution | Adding method of anti-oxidant | Removal method of solvent | Number of foreign particles having a particle diameter $\geq 5$ μm, particles/g | Haze of lens % | Bit error rate of optical disk |
|---|---|---|---|---|---|---|
| Ex. 19 | 1 | Added to solution | Direct drying | $2.1 \times 10^3$ | 0.1 | $\leq 1 \times 10^{-5}$ |
| Ex. 20 | 2 | Added to solution | Direct drying | $1.7 \times 10^4$ | 0.2 | $\leq 4 \times 10^{-5}$ |
| Ex. 21 | 3 | Added to solution | Direct drying | $1.2 \times 10^4$ | 0.2 | $\leq 4 \times 10^{-5}$ |
| Ex. 22 | 4 | Added to solution | Direct drying | $6.7 \times 10^3$ | 0.1 | $\leq 2 \times 10^{-5}$ |
| Ex. 23 | 5 | Added to solution | Direct drying | $3.0 \times 10^3$ | 0.1 | $\leq 2 \times 10^{-5}$ |
| Ref. Ex. 2 | 6 | Added to solution | Direct drying | $5.3 \times 10^4$ | 0.3 | $\leq 8 \times 10^{-5}$ |
| Ref. Ex. 3 | 1 | Single-screw kneading | Solidifying and drying | $4.4 \times 10^5$ | 0.4 | $\leq 2 \times 10^{-4}$ |
| Ref. Ex. 4 | 1 | Twin-screw kneading | Direct drying | $2.7 \times 10^5$ | 0.4 | $\leq 1 \times 10^{-4}$ |

(Note)
The filtration method of the polymer solution was as follows. All the polymer solutions were filtered through a metal fiber-made filter (pore size: 0.5 μm, product of Nichidai K.K.), and the filtrate was further filtered in the following manner.
1: Zeta Plus filter 3OS (pore size: 0.5 to 1 μm, product of Cuno Co.) → metal fiber-made filter (pore size: 0.2 μm, product of Nichidai K.K.);
2: Zeta Plus filter 3OS (pore size: 0.5 to 1 μm, product of Cuno Co.) → metal fiber-made filter (pore size: 0.5 μm, product of Nichidai K.K.);
3: Metal fiber-made filter (pore size: 0.5 μm, product of Nichidai K.K.) → Zeta Plus filter 3OS (pore size: 0.5 to 1 μm, product of Cuno Co.);
4: Metal fiber-made filter (pore size: 0.2 μm, product of Nichidai K.K.);
5: Metal fiber-made filter (pore size: 0.2 μm, product of Nichidai K.K.) → metal fiber-made filter (pore size: 0.2 μm, product of Nichidai K.K.);
6: Metal fiber-made filter (pore size: 0.5 μm, product of Nichidai K.K.).

INDUSTRIAL APPLICABILITY

According to the present invention, there are provided resin materials for molding, which exhibit sufficiently small birefringence and are excellent in mechanical strength and suitable for use as substrates for information recording media, and substrates for information recording media, which are molded from such a resin material. According to the present invention, there are also provided novel hydrogenated products of Aromatic Vinyl polymers suitable for use as molding materials for substrates for information recording media, which can mold moldings which exhibit sufficiently small birefringence and are excellent in mechanical strength, moisture resistance such as prevention of whitening under high-temperature and high-humidity environment and durability of a recording film and surface smoothness, and are also excellent in molding and processing ability, and resin compositions comprising such a hydrogenated product of the aromatic vinyl polymer. The substrates for information recording media according to the present invention are useful in, a field of information recording media of which small birefringence, and excellent mechanical strength, moisture resistance, and molding and processing ability are required, in particular as substrates for magneto-optical disks, digital video desks (DVDs) and the like. The novel substances according to the present invention have excellent properties as molding materials are useful in not only a field of information recording media, but also an optical field, a field of container (for medical goods, cosmetics, etc.), a field of electric insulation and other fields.

According to the present invention, there are further provided high-quality hydrogenated products of aromatic vinyl polymers, which are extremely little in the content of fine foreign matter having no compatibility with the polymers. According to the production process comprising a filtration process and a concentrating and drying process (particularly, multi-stage concentrating and drying process) in combination, high-quality hydrogenated products of Aromatic Vinyl polymers can be provided while avoiding disadvantages such as reduction of molecular weight by thermal decomposition. Moldings formed from a resin material comprising the hydrogenated product of the aromatic vinyl polymer according to the present invention are excellent in transparency, heat resistance and low, moisture absorption property, small in birefringence and markedly improved in haze value, and are hence suitable for use in optical parts such as optical lenses. Optical disk substrates formed such a resin material are markedly improved in bit error rate. Magnetic disk substrates formed this resin material are prevented from forming minute projections on their surfaces, and so tracking error is markedly prevented. Moldings formed from the resin: material are also suitable for use as semiconductor related parts because occurrence of foreign matter is lessened.

What is claimed is:

1. A hydrogenated polymer obtained by hydrogenating an aromatic vinyl polymer, wherein the hydrogenated polymer has the following features:
    (a) the hydrogenation rate of the aromatic rings thereof is at least 97%;
    (b) a ratio (Mw/Mn) of the weight average molecular weight (Mw) to the number average molecular weight (Mn) is at most 2.0;
    (c) the weight average molecular weight (Mw) is 100,000 to 300,000; and
    (d) the content of a component having a molecular weight (M) of at most 10,000 is at most 2% by weight based on the total weight of the polymer.

2. A hydrogenated polymer obtained by hydrogenating an aromatic vinyl polymer, wherein the content of foreign matter having a particle diameter of at least 0.5 $\mu$m in the hydrogenated polymer is at most $3.0 \times 10^4$ particles/g.

3. A resin composition comprising a hydrogenated polymer obtained by hydrogenating an aromatic vinyl polymer and having the following features:
    (a) the hydrogenation rate of the aromatic rings thereof is at least 97%;
    (b) a ratio (Mw/Mn) of the weight average molecular weight (Mw) to the number average molecular weight (Mn) is at most 2.0;
    (c) the weight average molecular weight (Mw) is 100,000 to 300,000; and
    (d) the content of a component having a molecular weight (M) of at most 10,000 is at most 2% by weight based on the total weight of the polymer, and an anti-whitening agent.

4. The resin composition according to claim 3, wherein the anti-whitening agent is contained in a proportion of 0.01 to 10 parts by weight per 100 parts by weight of the hydrogenated polymer.

5. The resin composition according to claim 3, wherein the anti-whitening agent is at least one substance selected from the group consisting of soft polymers, partially etherified compounds of polyhydric alcohols, partially esterified compounds of polyhydric alcohols and finely particulate fillers.

6. A substrate for information recording media, which is obtained by molding a resin material comprising A hydrogenated polymer obtained by hydrogenating an aromatic vinyl polymer and having the following features:
    (a) the hydrogenation rate of the aromatic rings thereof is at least 97%;
    (b) a ratio (Mw/Mn) of the weight average molecular weight (Mw) to the number average molecular weight (Mn) is at most 2.0; and
    (c) the weight average molecular weight (Mw) is 100,000 to 300,000.

7. The substrate for information recording media according to claim 6, wherein the resin material is a resin composition comprising the hydrogenated polymer and an anti-whitening agent.

8. The substrate for information recording media according to claim 6, wherein the number of depressed defects 0.3 $\mu$m or greater in length or width and 10 nm or greater in depth as detected by observation through an AFM (atomic force microscope) is at most 4 defects/50 positions.

9. The substrate for information recording media according to claim 6, which further has a protective coating layer.

10. The substrate for information recording media according to claim 6, which is capable of optically reading.

11. A process for producing a substrate for information recording media, which comprises molding a resin material containing a hydrogenated polymer obtained by hydrogenating an aromatic vinyl polymer and having the following features:
    (a) the hydrogenation rate of the aromatic rings thereof is at least 97%;
    (b) a ratio (Mw/Mn) of the weight average molecular weight (Mw) to the number average molecular weight (Mn) is at most 2.0;
    (c) the weight average molecular weight (Mw) is 100,000 to 300,000; and
    (d) the content of a component having a molecular weight (M) of at most 10,000 is at most 2% by weight based on the total weight of the polymer, into the form of a substrate.

12. The production process according to claim 11, wherein the resin material is a resin composition comprising the hydrogenated polymer and an anti-whitening agent.

13. The production process according to claim 11, wherein the molding is conducted under an atmosphere of a low oxygen concentration.

14. The production process according to claim 11, wherein the resin material is molded after the resin material is subjected to a heat treatment, a treatment under reduced pressure or a heat treatment and a treatment under reduced pressure.

* * * * *